(12) United States Patent
Frolikov

(10) Patent No.: US 11,656,778 B2
(45) Date of Patent: May 23, 2023

(54) SELECTION OF BLOCK SIZE FOR NAMESPACE MANAGEMENT IN NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/404,883

(22) Filed: Aug. 17, 2021

(65) Prior Publication Data

US 2023/0058424 A1 Feb. 23, 2023

(51) Int. Cl.
*G06F 3/06* (2006.01)

(52) U.S. Cl.
CPC ............ *G06F 3/064* (2013.01); *G06F 3/0604* (2013.01); *G06F 3/0631* (2013.01); *G06F 3/0659* (2013.01); *G06F 3/0679* (2013.01)

(58) Field of Classification Search
CPC ...... G06F 3/064; G06F 3/0604; G06F 3/0631; G06F 3/0659; G06F 3/0679
See application file for complete search history.

(56) References Cited

U.S. PATENT DOCUMENTS

| | | | | |
|---|---|---|---|---|
| 8,589,659 | B1 * | 11/2013 | Shapiro | G06F 3/0685 711/216 |
| 8,683,170 | B1 * | 3/2014 | Patnaik | G06F 3/067 711/170 |
| 10,223,254 | B1 | 3/2019 | Frolikov | |
| 10,437,476 | B2 | 10/2019 | Frolikov | |
| 2015/0277802 | A1 * | 10/2015 | Oikarinen | G06F 3/0689 711/114 |
| 2019/0121543 | A1 * | 4/2019 | Frolikov | G06F 3/0604 |
| 2019/0121548 | A1 | 4/2019 | Frolikov | |
| 2019/0146907 | A1 | 5/2019 | Frolikov | |
| 2019/0146927 | A1 * | 5/2019 | Frolikov | G06F 12/1009 711/103 |
| 2019/0317682 | A1 * | 10/2019 | Li | G06F 3/0632 |
| 2020/0097183 | A1 * | 3/2020 | Rawal | G06F 12/0891 |
| 2021/0255920 | A1 * | 8/2021 | Bernat | G06F 12/0246 |
| 2022/0091754 | A1 * | 3/2022 | Raman | G06F 3/0613 |
| 2022/0269418 | A1 * | 8/2022 | Black | G06F 3/064 |

* cited by examiner

*Primary Examiner* — Francisco A Grullon
(74) *Attorney, Agent, or Firm* — Greenberg Traurig LLP

(57) ABSTRACT

A computer storage device having a host interface, a controller, non-volatile storage media, and firmware. The firmware instructs the controller to select a block size for allocating blocks to namespaces based on a storage capacity of the non-volatile storage media. Various requests by a host to create namespaces are received by the controller via the host interface. After each request is received, the controller allocates blocks to the requested namespace using the selected block size. The controller can select the block size at the time of initial manufacture or operation, and/or can dynamically select various block sizes during operation of the storage device. Dynamic selection of the block size can be based on signaling from sensors of the storage device and/or host.

35 Claims, 17 Drawing Sheets

FIG. 9
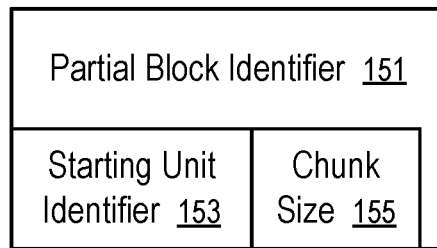
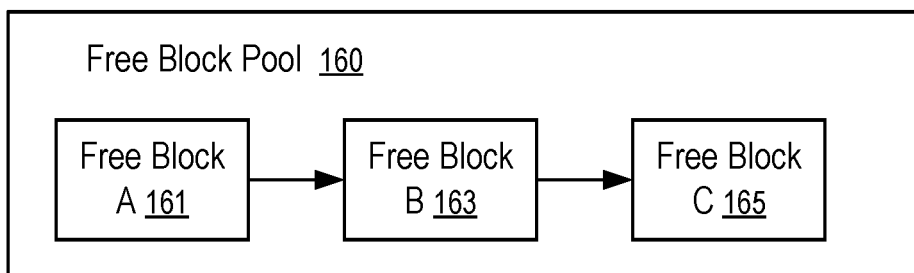
FIG. 10
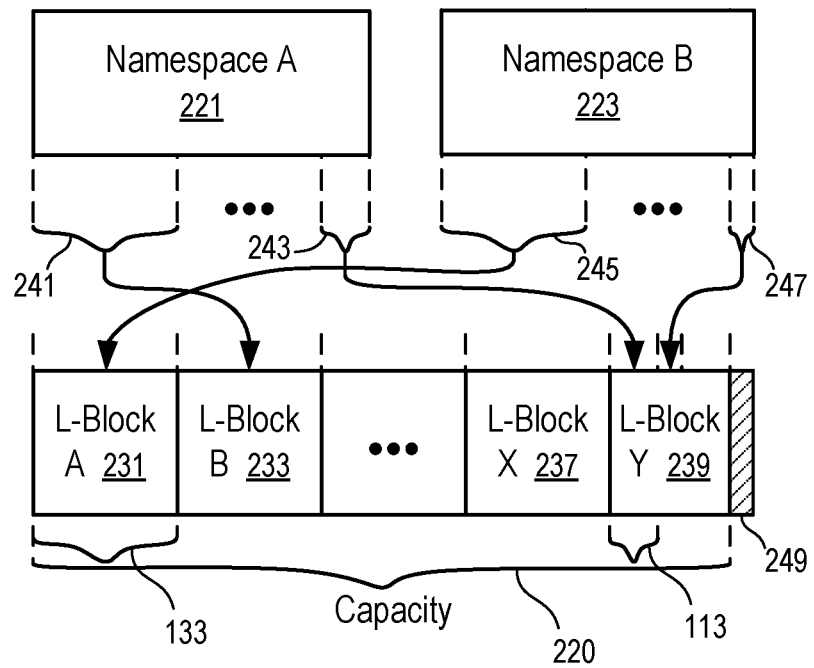
FIG. 11

SELECTION OF BLOCK SIZE FOR NAMESPACE MANAGEMENT IN NON-VOLATILE MEMORY DEVICES

FIELD OF THE TECHNOLOGY

At least some embodiments disclosed herein relate to computer storage devices in general and more particularly, but not limited to selection of block size for namespace management in non-volatile storage devices.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

FIG. 9 illustrates an example partial block identifier that can be used to implement the namespace map of FIG. 8.

FIG. 10 illustrates an example data structure to manage a pool of free blocks available for namespace allocation using the technique of FIG. 8.

FIG. 11 illustrates an example of allocating namespaces using partial blocks.

DETAILED DESCRIPTION

Figure 1:
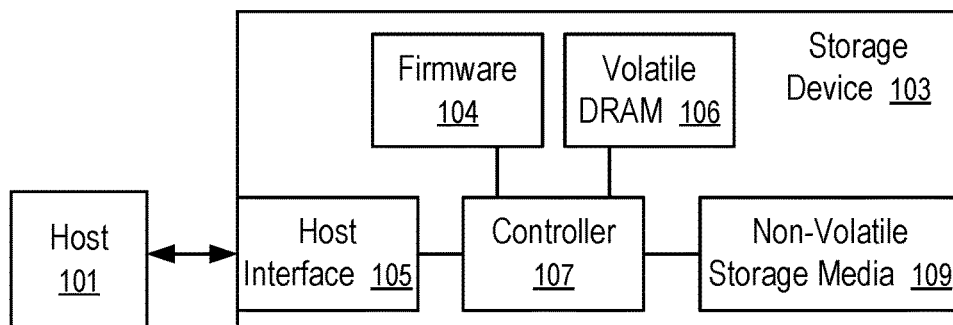
FIG. 1 shows a computer system in which embodiments disclosed herein can be implemented.

At least some embodiments disclosed herein provide efficient and flexible ways to implement logical storage allocations and management in storage devices.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

FIG. 1 shows a computer system in which embodiments disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
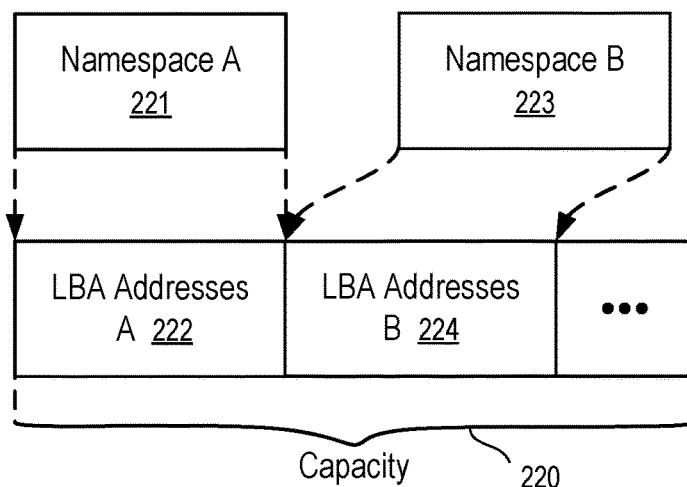
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
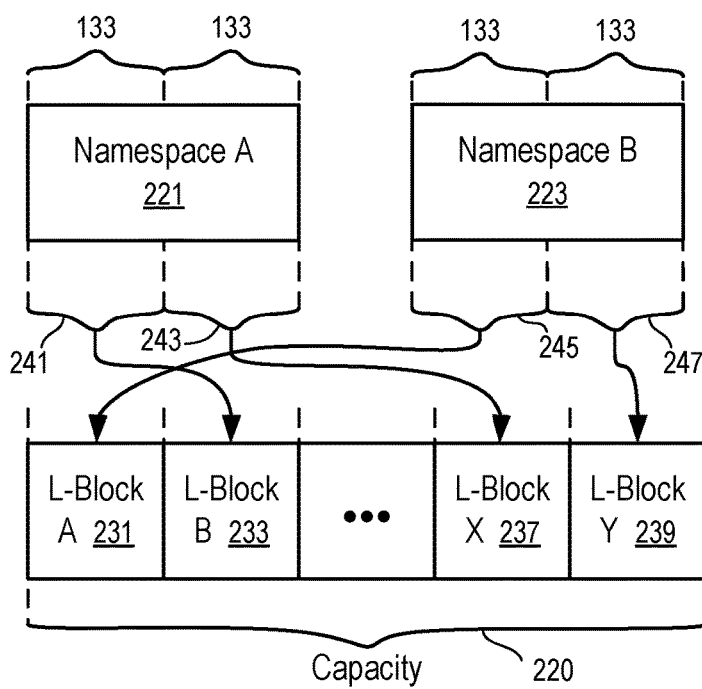
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, . . . , 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, . . . , 237, 239) illustrated in FIG. 3, the allocation of a namespace (e.g., 221 or 223) does not have to be from a contiguous region of the capacity (220). A set of L-blocks (231, 233, . . . , 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
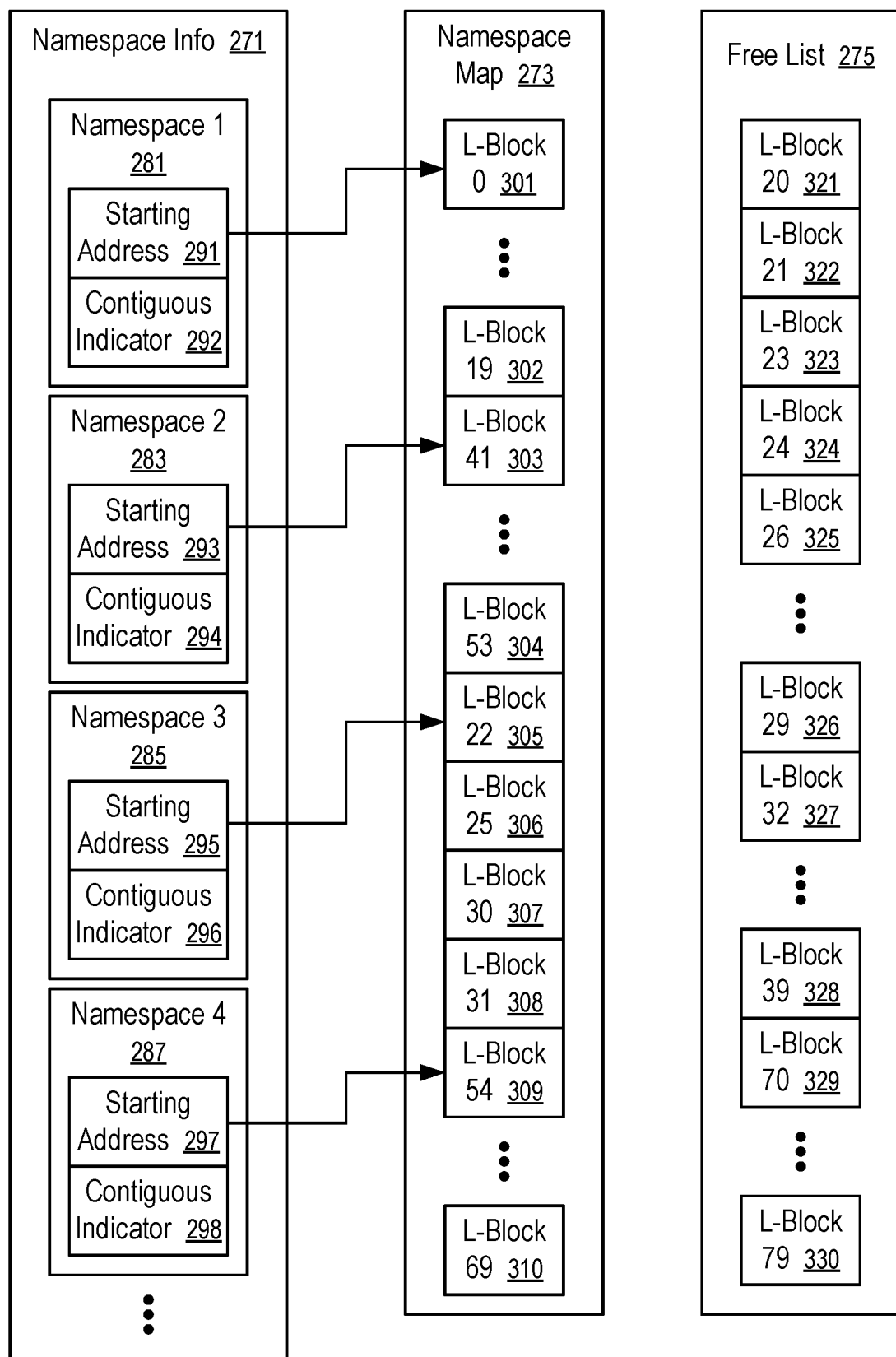
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, . . . , 237, 239) that have been allocated to a set of namespaces (e.g., 221, 223) identified in namespace info (271).

In the array of the namespace map (273), the identifications of L-blocks (301, . . . , 302; 303, . . . , 304; 305, . . . 308; or 309, . . . , 310) allocated for each namespace (281, 283, 285, or 287) are stored in a contiguous region of the array. Thus, the portions of identifications of L-blocks (301, . . . , 302; 303, . . . , 304; 305, . . . 308; and 309, . . . , 310) allocated for different namespaces (281, 283, 285, and 287) can be told apart from the identification of the starting addresses (291, 293, 295, and 297) of the block identifications in the array.

Optionally, for each of the each namespaces (281, 283, 285, or 287), the namespace info (271) identifies whether or not the L-blocks (301, . . . , 302; 303, . . . , 304; 305, . . . 308; or 309, . . . , 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220).

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, . . . , 326-327, . . . , 328-329, . . . , 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
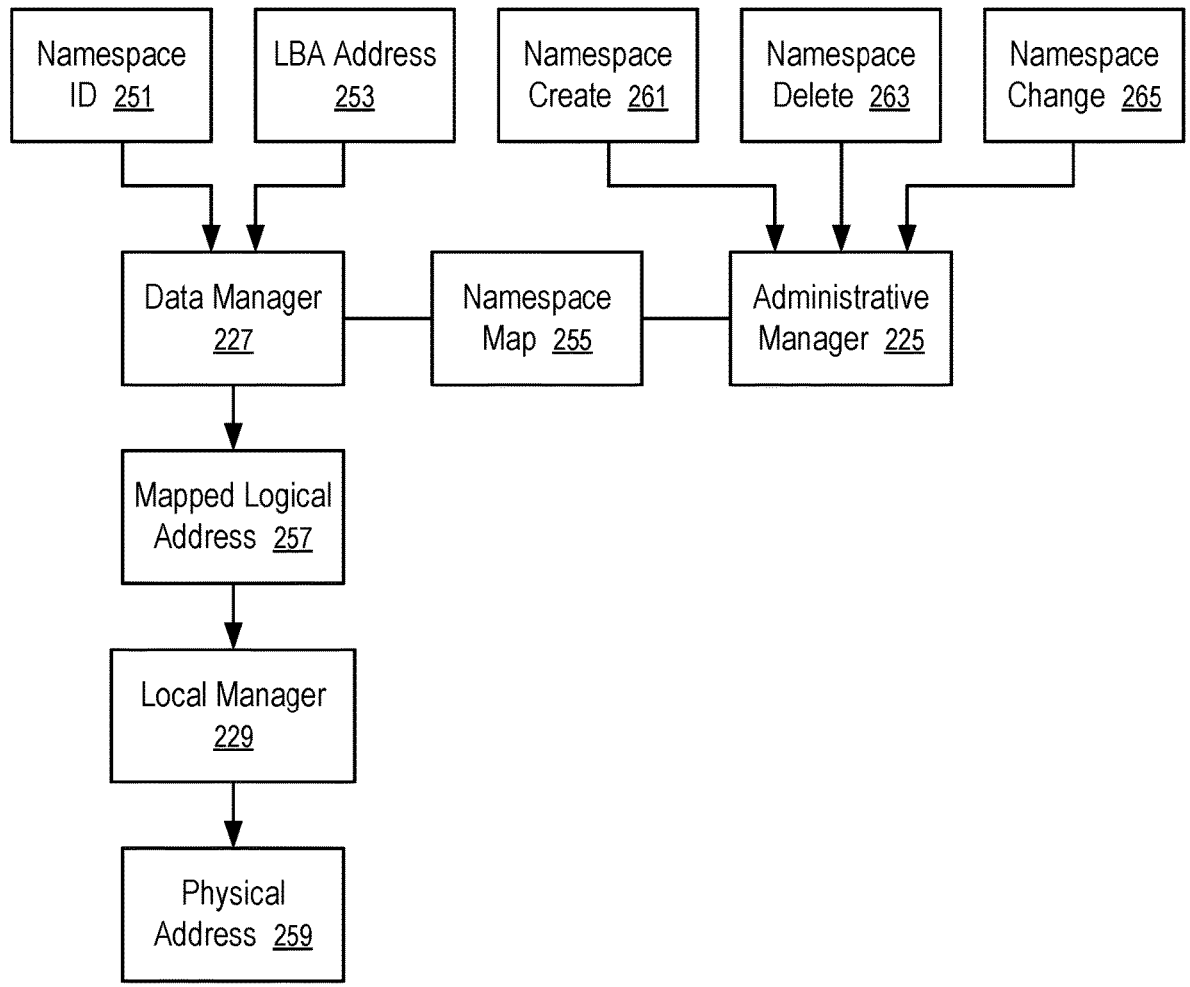
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
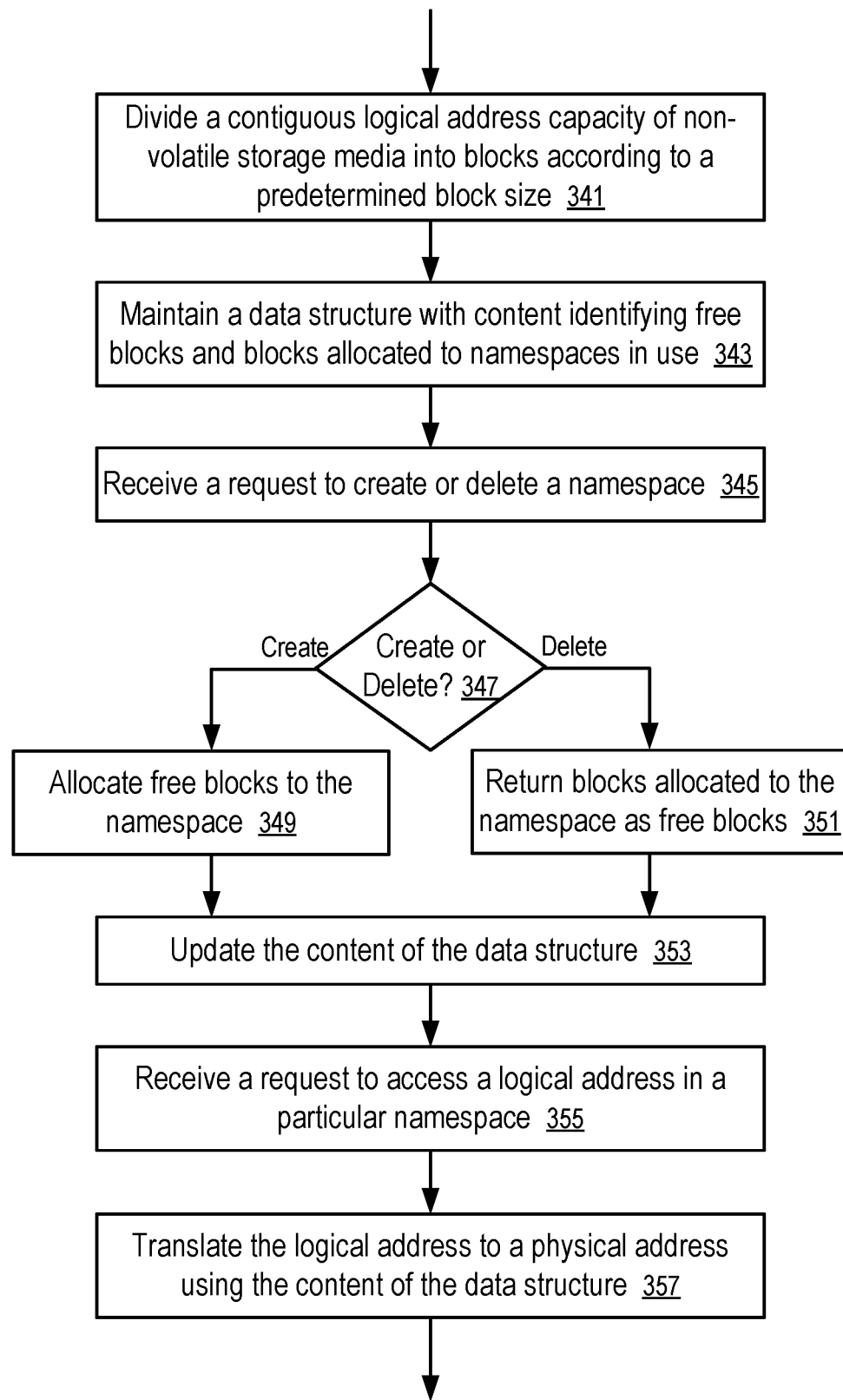
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, . . . , 237, 239) according to a predetermined block size (133) and maintaining (343) a data structure (e.g., illustrated in FIG. 4) with content identifying free blocks (e.g., 312-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 312-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, . . . , 237, 239) according to the block size (133); and maintain a data structure to identify: a free subset of the L-blocks that are available for allocation to new namespaces (e.g., L-blocks 312-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace to the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

Figure 7:
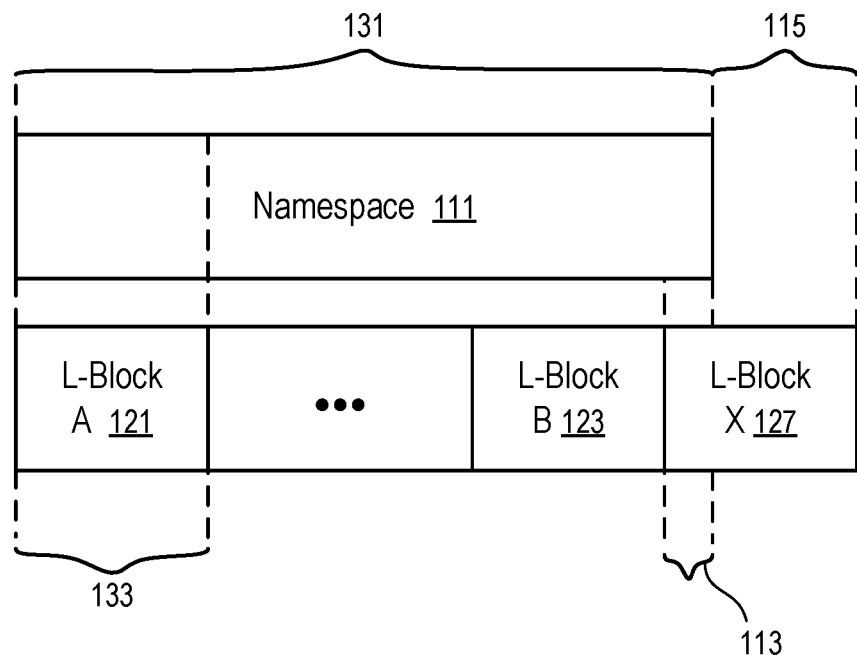
FIG. 7 shows an example diagram where a namespace is not aligned with block boundaries and can be implemented using the techniques of FIGS. 8-10.

FIG. 7 shows an example diagram where a namespace is not aligned with block boundaries and can be implemented using the techniques of FIGS. 8-11.

When a host (e.g., 101 in FIG. 1) requests the creation or reservation of a namespace (111) having a requested namespace size (131), a controller (e.g., 107 in FIG. 1) allocates a section of its non-volatile storage media (e.g., 109 in FIG. 1) to be addressed via LBA addresses under the namespace (111).

In a scenario illustrated in FIG. 7, the requested namespace size (131) is not the multiple of the block size (133). As a result, if the first LBA address in the namespace (111) representing a memory unit located in the namespace (111) is aligned with (e.g., mapped to) the first LBA address of an L-block (e.g., 121), the last LBA address in the namespace (111) cannot be aligned with (e.g., mapped to) the last LBA address of an L-block (e.g., 123), as illustrated in FIG. 7. Therefore, the namespace (111) is not aligned with boundaries of L-blocks for allocation. Since the requested namespace size (131) is not the multiple of the block size (133), the requested namespace size (131) is best satisfied by a number of full blocks (121, . . . , 123) and a portion (113) of a full block (127). The portion (113) is also referred to as a partial block (113).

In FIG. 7, the portion (113) of the full block (127) (or partial block (113)) is allocated for the namespace (111); and the remaining portion (115) of the full block (127) (or partial block (115)) is not allocated for the namespace (111). The remaining portion (115), or a portion of it, can be subsequently allocated to another namespace that also needs a partial block. Different namespaces may use different portions (e.g., 113, 115) of the full block (127).

Figure 8:
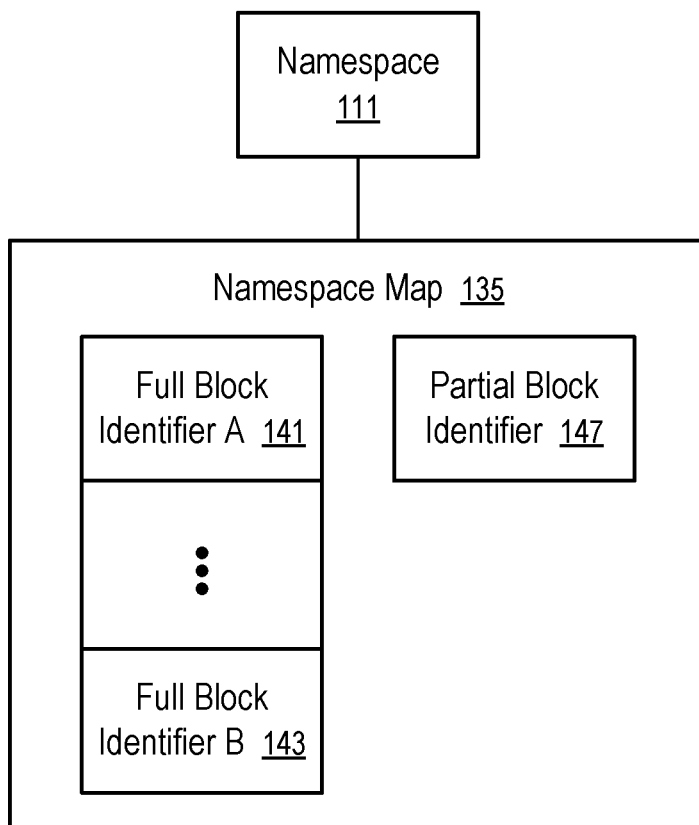
FIG. 8 illustrates an example block diagram of a namespace map to implement a namespace that is not aligned with block boundaries.

FIG. 8 illustrates an example block diagram of a namespace map to implement a namespace that is not aligned with block boundaries.

In FIG. 8, a namespace map (135) is linked to the namespace (111) to identify the blocks of LBA addresses allocated for the namespace (111). Any techniques for identification of the association of two items can be used to link the namespace map (135) to the namespace (111). For example, an identifier of the namespace map (135) can be stored in association with an identifier of the namespace (111) to link the namespace map (135) and the namespace (111). For example, a list of pointers corresponding to a list allocated namespaces can be used to identify the beginning memory locations of data structures of namespace maps to link the namespace maps with their namespaces. The addresses in the L-blocks (e.g., (121, . . . , 123)) can be further translated to the corresponding addresses of the physical storage locations by a separate layer of the firmware (104) (e.g., Flash Translation Layer (FTL) for solid state drives (SSDs)).

The namespace map (135) includes the identifiers (141, . . . , 143) of the full blocks (121, . . . , 123) allocated for the namespace (111) and an identifier (147) of a partial block (113) allocated for the namespace (111).

Since the full blocks (121, . . . , 123) have the same, predetermined block size (133), the list of full block identifiers (141, . . . , 143) can be identified using an array or list of the identifiers of starting units (or ending units) of the full blocks (121, . . . , 123). This arrangement simplifies the namespace map (135) and enables efficient address translation. However, the partial block (113) cannot be represented in such a way.

FIG. 9 illustrates an example partial block identifier that can be used to implement the namespace map of FIG. 8.

In FIG. 9, a partial block identifier (151) includes a starting unit identifier (153) and a chunk size (155). The starting unit identifier (153) is an identifier of the first logical memory unit in the partial block (e.g., 113 or 115) represented by the partial block identifier (151). When the partial block (113) is allocated on a chunk of memory units, the chunk size (155) represents the quantity of the memory units allocated to the partial block (113). Thus, the chunk size (155) can be added to the starting unit identifier (153) to compute the ending unit identifier, which is the last unit in the partial block (e.g., 113 or 115) represented by the partial block identifier (151). In combination, the partial block identifier (151) identifies a unique portion (e.g., 113 or 115) of a full block (e.g., 127). When the chunk size (155) is equal to the block size (133), the partial block identifier (151) actually represents a full block. So, a partial block identifier (151) can be used to represent a full block (which can be subsequently divided into multiple partial blocks (e.g., 113 or 115); and multiple contiguous partial blocks (e.g., 113 or 115) can be combined into a full block (e.g., 127).

For example, the partial block identifier (151), having the corresponding data specifying the starting unit identifier (153) and the chunk size (155) for the partial block (113), can be used as the partial block identifier (147) in the namespace map (135) of FIG. 8 to represent the partial block (113) in FIG. 7 allocated for the namespace (111).

For example, the partial block identifier (151), having the corresponding data specifying the starting unit identifier (153) and the chunk size (155) for the partial block (115), can be used to represent the unallocated partial block (115) in FIG. 7 that is free and available for allocation to another namespace. A linked list of unallocated partial blocks (e.g., 115) can be used to track a pool of free partial blocks.

Alternatively, the chunk size (155) in the partial block identifier (151) can be replaced with the ending unit identifier of the corresponding partial block. The partial block identifier (151) can also be equivalently represented by a combination of the chunk size (155) and the ending unit identifier.

The controller (107), programmed by the firmware (104), stores data (e.g., in volatile DRAM (106) and/or non-volatile storage media (109)) to track a pool of free blocks using a linked list of partial blocks as illustrated in FIG. 10.

Preferably, each namespace map (135) uses no more than one partial block (113) for efficient address translation. However, in some instances, a namespace map (e.g., 135) may include multiple partial blocks (e.g., 113) when there is not a single free partial block (e.g., 113) to satisfy the request.

FIG. 10 illustrates an example data structure to manage a pool of free blocks available for namespace allocation using the technique of FIG. 8.

A data structure of a free block pool (160) includes identifiers of free blocks (161, 163, . . . , 165).

In one implementation, the free block pool (160) is used to track the available free partial blocks (e.g., 115) that can be allocated to new namespaces. Each of the free blocks (161, 163, . . . , 165) can be identified using the partial block identifier (151) illustrated in and/or discussed in connection with FIG. 9.

In some implementations, the free block pool (160) also optionally tracks the available free full blocks (161, 163, . . . , 165), where each of the full blocks are conveniently represented using the data structure of the partial block identifier (151) illustrated in FIG. 9, with the chunk size (155) being equal to the block size (133).

In other implementations, the free block pool (160) tracks the available free full blocks (161, 163, . . . , 165), using a list of full block identifiers in a way similar to the list of full block identifiers used in the namespace map (135), where each of the full block identifiers is presented by a representative unit identifier (e.g., a starting unit, or an ending unit), in view of the known, uniform block size (133) of the full blocks.

The administrative manager (225) may use the partial block identification techniques discussed above in connection with FIGS. 7-10 to efficiently handle the mismatch of the requested namespace size (131) and/or the capacity (220) with the block size (133), with increased flexibility and minimum impact on address translation performance, as illustrated in FIG. 11.

FIG. 11 illustrates an example of allocating namespaces using partial blocks.

For example, the technique of FIG. 11 can be used to facilitate dynamic namespace management on the storage device (103) illustrated in FIG. 1 using the partial block identification techniques of FIGS. 8-10.

In FIG. 11, the storage capacity (220) of the non-volatile storage media (109) is divided into blocks of LBA addresses (L-blocks) (231, 233, . . . , 237) of the same size (e.g., 133 illustrated in FIG. 7), except that the last block (239) has a size smaller than the predetermined block size (133). In FIG. 11, the administrative manager (225) may virtually expand the last block (239) to include a virtual capacity (249) such that the last block (239) may also be viewed to have the same size (133). However, since the virtual capacity (249) is not available for allocation to any namespace, the administrative manager (225) puts the free portion of the last block (239) in a free block pool (160) as an available partial block (e.g., represented by a partial block identifier (151) of FIG. 9, as if the portion of the virtual capacity (249) had already been allocated to an existing namespace.

Preferably, the block size (133) is a power of two, which is advantageous in optimizing the computations involving the block size (133). For example, when the block size (133) is a power of two, operations of division, modulo, and/or multiplication involving the block size (133) can be simplified via shift operations.

The logical addresses in the L-blocks (231, 233, . . . , 237, 239) can be translated into physical addresses of the non-volatile storage media (109) independent from the allocation of namespaces (e.g., 221, 223) (e.g., by a flash translation layer of the firmware (104) of the storage device (103) configured as a solid state drive (SSD)).

Dividing the storage capacity (220) into the (L-blocks) (231, 233, . . . , 237), with a possible partial block (239), allows the dynamic management of namespaces at the block level. The logical addresses defined in the namespaces (e.g., 221, 223) are mapped to the L-blocks (231, 233, 237, 239) defined on the capacity (220) such that the namespace implementation details are shielded from the translation from the mapped logical address (257) in the L-blocks (231, 233, 237, 239) to the physical addresses (259) of the non-volatile storage media (109).

For example, a full size block (241) of logical addresses in namespace A (221) is linearly mapped into the mapped logical addresses (257) in one L-block (233). Similarly, a full size block (245) of logical addresses in namespace B (221) is linearly mapped into the mapped logical addresses (257) in another L-block (231). The block-wise mapping of logical addresses improves efficiency in the address translation.

When the sizes of the namespaces (221, 223) are not multiples of the block size (133), portions (243, 247) of the namespaces (221, 223) can be mapped to partial blocks of one or more full size blocks (e.g., 237) in a way as illustrated in FIGS. 7-11. The data structure of FIG. 4 can be modified to include a partial block identifier (147) of a partial L-block (113) allocated to a namespace (221) that has a last portion (e.g., 243) that is smaller than the predetermined block size (133), and to include a list of free partial blocks.

By maintaining a namespace map (e.g., 135 illustrated in FIG. 8, 273 illustrated in FIG. 4, which may be further modified to include partial block identifiers) and a free block pool (e.g., 160 illustrated in FIG. 10, 275 illustrated in FIG. 4, which may be further modified to include partial block identifiers), the controller (107) of the storage device (103) allows dynamic management of namespaces, where namespaces may be created/allocated when needed, deleted when no longer used, and/or resized, with fragmentation impact being reduced or eliminated. The mapping from the logical addresses in the namespace (e.g., 221, 223) to the logical addresses for translation to physical addresses can be dynamically adjusted in response to the commands from the host (101) to create/allocate, delete, and/or resize namespaces (e.g., shrink or expand).

Optionally, when the host (101) requests a namespace (e.g., 111, 221, or 223) that has a size not aligned with a block boundary, the host (101) may be prompted to revise the size of the namespace (e.g., 111, 221, or 223) for alignment with a block boundary.

Figure 12:
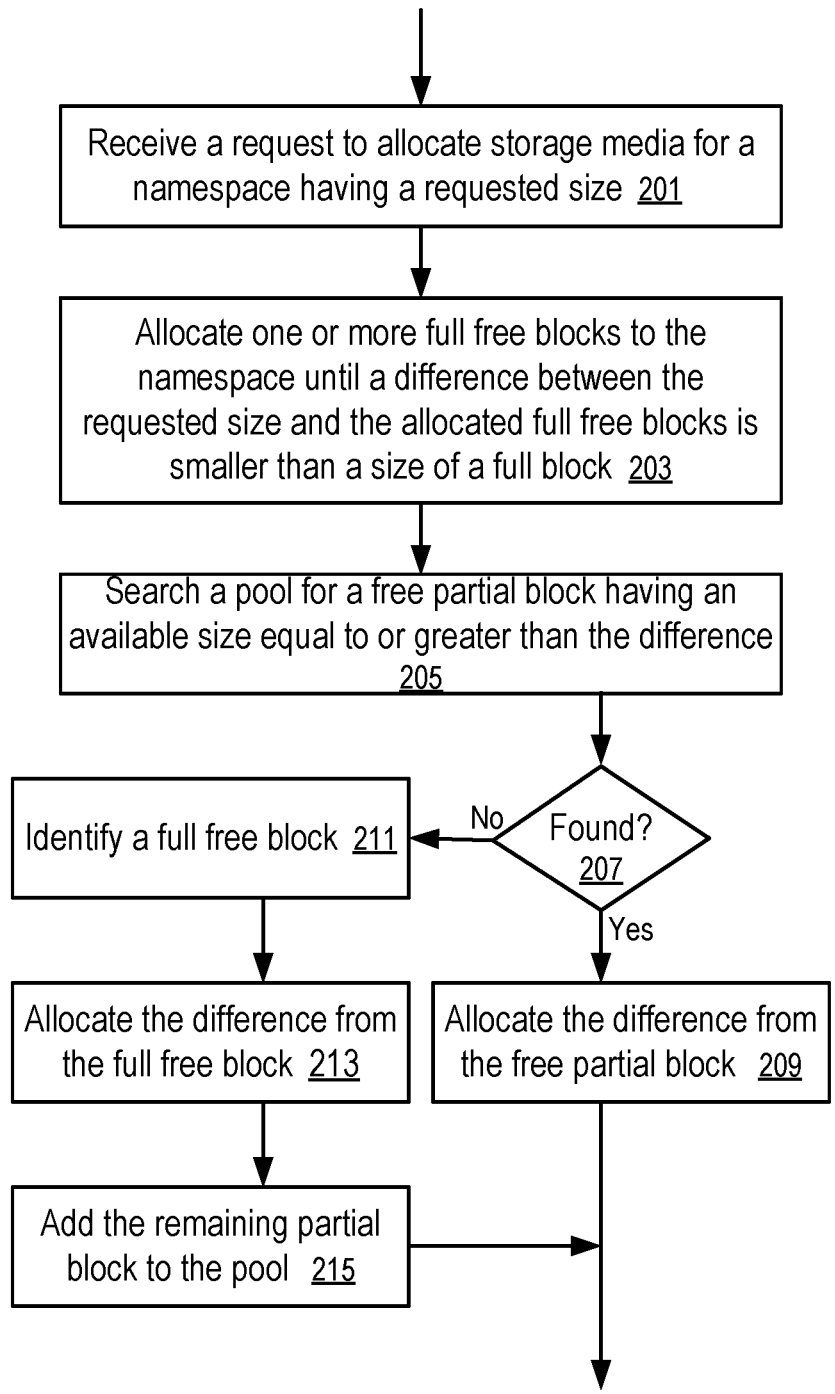
FIG. 12 shows a method to allocate a namespace on a storage device according to one embodiment.

FIG. 12 shows a method to allocate a namespace on a storage device according to one embodiment.

For example, the method of FIG. 12 can be implemented via executing the firmware (104) by the controller (107) of the storage device (103).

The method includes receiving (201) a request to allocate a portion of the non-volatile storage media (109) of the storage device (103) for a namespace (111) having a requested namespace size (131), which may or may not be a multiple of the size (133) of full L-blocks on the storage device (103).

In response to the request, the method further includes allocating (203) one or more full free L-blocks (121, . . . , and/or 123) to the namespace (111) until a difference between the requested namespace size (131) and the allocated one or more full free L-blocks (121, . . . , and/or 123) is smaller than the size (133) of a full L-block (e.g., 121, . . . , 123, or 127).

When the difference is smaller than the full block size (133), the method further includes searching (205) a free block pool (160) for one or more free partial blocks (161, 163, 165) having a total available size equal to or greater than the difference (113). Preferably, no more than one partial block is used for the difference.

If one or more free partial blocks (e.g., 161) that have a total size of available storage capacity equal to or greater than the difference (113) are found (207), the method further includes allocating (209) the difference (113) from the one or more free partial blocks (e.g., 161). If the available storage capacity is larger than the difference (113), the remaining unallocated one or more partial blocks are free and remain in the pool (160). If the available storage capacity is equal to the difference, the entirety of the one or more free partial blocks (e.g., 161) is allocated to the namespace (111) and thus removed from the free block pool (160).

If one or more free partial blocks having a total size of available storage capacity equal to or greater than the difference are not found (207), the method further includes: identifying (211) a full free block (e.g., 127); allocating (213) the difference (113) from the identified full free block (e.g., 127); and adding (215) the remaining partial block (115) of the identified full free block to the pool (160).

In some implementations, when there is no available full free block to successfully carry out the operation of identifying (211) a full free block for the difference, the method may report an error or warning, and/or attempt to use more than one free partial block (e.g., 161 and 163) to meet the difference.

When the namespace (111) is deleted, the partial block (113) allocated for the namespace (111) is freed and added to the free block pool (160); and full blocks (121, . . . , 123) allocated for the namespace (111) are also freed and become available for allocation to other namespaces. A routine of the firmware (104) detects and combines contiguous free partial blocks (e.g., 113 and 115) to reduce the numbers of partial free blocks in the pool (160). When partial free blocks (e.g., 113 and 115) in the pool (160) are combined into a full free block (127), the partial free blocks (e.g., 113 and 115) are converted into a free block representation (e.g., represented by the identification of a representative unit, such as a starting or ending unit).

For example, a computer storage device (103) of one embodiment includes: a host interface (105); a controller (107); and non-volatile storage media (109). The computer storage device (103) has firmware (104) containing instructions, which when executed by the controller (107), instruct the controller (107) to at least: receive, via the host interface (105), a request from a host (101) to allocate a namespace (111) of a requested namespace size (131) of non-volatile memory; generate, in response to the request, a namespace map (135) that identifies a plurality of L-blocks (121, . . . , 123), each having the same predetermined block size (133), and a partial L-block (113) having a size smaller than the predetermined block size (133); and convert, using the namespace map (135), logical addresses in the namespace (111) communicated from the host (101) to physical addresses (259) for the quantity of the non-volatile memory.

For example, the request to allocate the namespace (111) can be made using a protocol that is in accordance with Non-Volatile Memory Host Controller Interface Specification (NVMHCI) or NVMe.

For example, the computer storage device (103) can be a solid state drive (SSD).

For example, a method implemented in the computer storage device (103) includes receiving, in the controller (107) coupled with a non-volatile storage media (e.g., 109), a request from a host (101) to create or reserve a namespace (111) of a requested namespace size (131) of non-volatile memory from the non-volatile storage media (e.g., 109) of the computer storage device (103) (e.g., in accordance with NVMe). In response to the request, the method further includes generating, by the controller (107), a namespace map (135) that identifies: a plurality of L-blocks (121, . . . , 123) having a same predetermined block size (133), and a partial L-block (113) having a size smaller than the predetermined block size (133). The L-blocks (121, . . . , 123, 113) are further translated to specific portions of the non-volatile storage media (e.g., 109) (e.g., via a translation layer). After the namespace map (135) is generated for the namespace (111), the method further includes converting, by the controller (107) using the namespace map (135), logical addresses in the namespace (111) communicated from the host (101) to physical addresses for the quantity of the non-volatile memory.

Preferably, each of the plurality of L-blocks (121, . . . , 123) is represented in the namespace map (135) using a full block identifier (e.g., 141, . . . , or 143) that includes no more than an identification of a representative unit (e.g., a starting unit or an ending unit), in view of the known, uniform block size (133) of full blocks (121, . . . , 123, 127). Optionally, a full block identifier (e.g., 141, . . . , or 143) may include an indication of the block size (133) (e.g., by including both the identification of the starting unit, and the identification of the ending unit).

Preferably, the partial L-block (113) is represented in the namespace map (135) using an identifier (153) of a starting unit allocated for the namespace (111) and a chunk size (155). The starting unit is not necessarily the first unit in the full L-block (127) from which the partial block (113) is allocated. For example, when a subsequent namespace needs a partial block that has a size smaller than or equal to the remaining block (115), the partial block allocated for the subsequent namespace can have a starting unit that follows the ending unit of the partial block (113) in the L-block (127).

Alternatively, the partial L-block (113) can be represented in the namespace map (135) by an identification of an ending unit allocated for the namespace (111) (or another representative unit) and a chunk size (155).

Optionally, the method further includes maintaining, in the computer storage device (103), a free block pool (160) that identifies any partial L-block(s) (e.g., 127) available for allocation to another namespace.

Preferably, the computer storage device (103) stores a copy of the namespace map (135) and the free block pool (160) in the non-volatile storage media (e.g., 109) of the storage device (103) for persistent storage and uses a copy of the namespace map (135) and the free block pool (160) in the volatile DRAM (106) for computation.

As an example, generating the namespace map (135) can be performed via: allocating the plurality of L-blocks (121, . . . , 123) for the namespace (111) such that the size difference between the requested namespace size (131) of the namespace (111) and the plurality of L-blocks (121, . . . , 123) is smaller than the block size (133). After the determination of the difference between the quantity (133) of non-volatile memory requested for the namespace (111) and the total size of the plurality of full L-blocks (121, . . . , 123), the method further includes searching in the free block pool (160) for a partial L-block that is equal to or larger than the difference.

If a first partial L-block (e.g., 161), having a size larger than the difference, is found in the free block pool (160), the method further includes: allocating a portion of the first partial L-block (e.g., 161) for the namespace (111) (e.g., by creating a partial block identifier (147) for the namespace map (135)); and updating the first partial L-block (161) in the free block pool (160) to represent a remaining portion of first partial L-block (e.g., 161) that is not allocated for the namespace (111) and is free for allocation to another namespace.

If a first partial L-block (e.g., 161) having a size equal to the difference is found in the free block pool (160), the method further includes: removing the first partial L-block (e.g., 161) from the free block pool (160); and allocating the first partial L-block (e.g., 161) for the namespace (111).

If no partial L-block having a size equal to or larger than the difference is found in the free block pool (160), a full size free block (e.g., 127) may be allocated for the pool (160) and temporarily treated as a partial free block (e.g., 161). For example, the method further includes: adding a first L-block (e.g., 127) having the same predetermined block size (133) to the free block pool (160) (e.g., as the free block (161)); allocating a portion (113) of the first L-block for the namespace (111); and updating the first L-block (161) in the free block pool (160) to represent a remaining portion (115) of the first L-block (e.g., 127) that is not allocated for the namespace (111) and is free for allocation to another namespace.

Optionally, the method further includes receiving, in the controller (107), a request from the host (105) to delete the namespace (111), and adding, to the free block pool (160) by the controller (107) in response to the request, the partial L-block (113), identified by the partial block identifier (147) in the namespace map (135) of the namespace (111).

When the free block pool (160) has more than one partial free block (e.g., 113 and 115), the method optionally further includes: identifying, in the free block pool (160), contiguous free partial blocks (e.g., 113 and 115); and combining, in the free block pool (160), the contiguous free partial blocks (e.g., 113 and 115) into a single free partial block.

Optionally, the method further includes: after combining free partial blocks (e.g., 113 and 115) in the free block pool (160), determining whether a combined free partial block (e.g., 127) is a full free block that has the predetermined block size (133); and in response to a determination that the combined free partial block (e.g., 127) has the predetermined block size (133), removing the combined free partial block (e.g., 127) from the free block pool (160), such that the free block pool (160) contains only the identifications of partial free blocks; and free full blocks can be more efficiently represented by a list of full block identifiers, where each block in the free block pool (160) is represented by a partial block identifier having an identification of an unit in the block and a chunk size.

Various embodiments described below relate to management of namespace block boundary alignment in non-volatile storage devices. Examples of storage devices include flash memory devices. The storage device may, for example, store data used by a host device (e.g., a processor of an autonomous vehicle, or a computing device that accesses data stored in the storage device). In one example, the storage device is a solid state drive (SSD) mounted in an electric vehicle.

For improved and/or consistent performance in address mapping in a storage device, storage spaces allocated to namespaces are managed using blocks of a predetermined size. As a result, the size of a namespace that can be created on a storage device is required to be aligned with a multiple of the predetermined size. For example, the predetermined size can be 2 GB. As a result, namespaces that are able to be created for optimized and/or consistent performance would have sizes that are multiples of 2 GB.

However, the entire available storage that is available in a storage device for allocation to namespaces is typically not a multiple of the predetermined block size. For example, an SSD can have a storage capacity of 15 GB. Thus, the storage capability of the SSD is misaligned with the boundaries of 2 GB blocks.

At least some embodiments address these and other technical problems by allowing a single namespace to be allocated and/or created using a partial block that is the difference between the entire storage capacity and the closest multiple of the predetermined block size. In one embodiment, the partial block is the last portion of the storage capacity of the storage device, such that the storage capacity other than the partial block is fully aligned with the blocks of the predetermined size.

In one embodiment, when a new namespace (e.g., a namespace having a size requested by a host) is created that is not aligned with the block boundaries of the predetermined size, a storage device can over-provision by allocating the smallest number of full blocks of the predetermined size that is not smaller than the requested size. However, when there are no more full blocks of the predetermined size for the creation of the new namespace, the partial block can be allocated for the new namespace (e.g., the new namespace can be the last namespace to be requested by the host) to better utilize the storage capacity of the storage device, without sacrificing performance and/or consistency in address mapping. Optionally, when the addition of the partial block to a number of full blocks can meet the requirement of a new namespace, the new namespace can be provisioned or over-provisioned using the partial block.

In one embodiment, a controller of a storage device maintains a free block pool including full blocks each having a same predetermined block size. The free block pool also includes one or more partial blocks each having a size smaller than the predetermined block size. The controller receives, via a host interface, a request from a host to allocate a namespace having a requested size. In response to the request, the controller allocates a number of full blocks to the namespace. The controller determines that a size difference between the total size of the number of full blocks and the requested size is less than the predetermined block size. In response to this determination, the controller determines a next block to allocate from the free block pool. The next block is selected at least based on the size difference. For example, the next block selected by the controller is one of the full blocks or one of the partial blocks in the free block pool. The controller then allocates this selected next block to the namespace.

In one embodiment, a controller maintains a free block pool including one or more full free blocks having a same predetermined block size, and a partial block having a size smaller than the predetermined block size. The controller receives, via a host interface, a request from a host to allocate a namespace having a requested size. In response to the request, the controller determines that the free block pool has a total number of full free blocks that is smaller than the requested size. The controller allocates the total number of full free blocks to the namespace. In response to determining that the total number of full free blocks is smaller than the requested size, the controller determines whether the size of the partial block is equal to or greater than a difference between the requested size and a size of the allocated full free blocks. Based on determining that the size of the partial block is equal to or greater than this difference, the controller allocates the partial block to the namespace.

Advantages provided by at least some of the embodiments related to management of namespace block boundary alignment as described herein include allowing the full utilization of the storage capacity of a storage device without sacrificing performance and consistency in address mapping.

Figure 13:
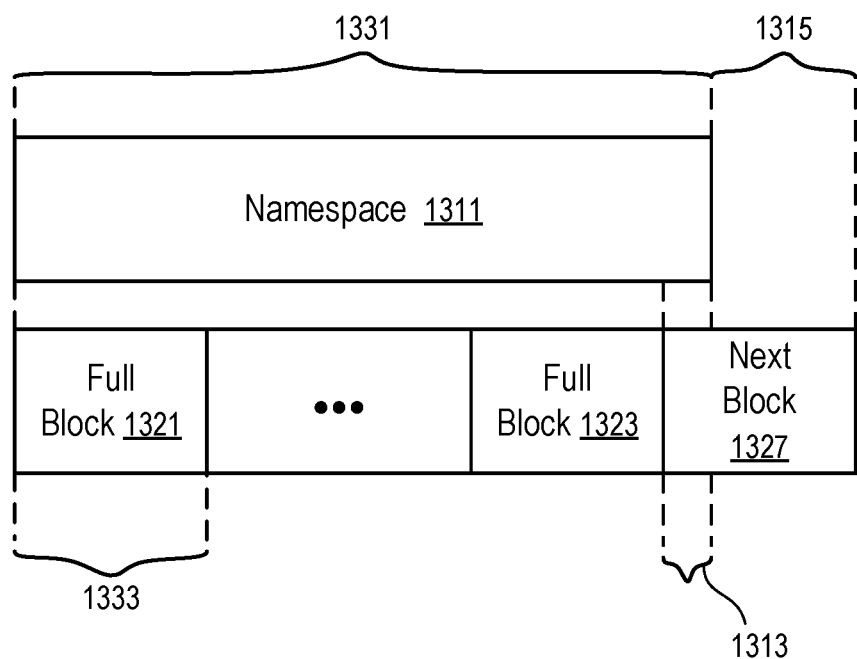
FIG. 13 illustrates an example of determining a next block to allocate to a namespace according to one embodiment.

FIG. 13 illustrates an example of determining a next block (1327) to allocate to a namespace (1311) according to one embodiment. The creation of namespace (1311) is requested by a host device (not shown). In one example, the host device is host (101) of FIG. 1. In one example, the request is received via host interface (105) by controller (107) of storage device (103).

In response to receiving the request, various blocks are allocated to namespace (1311). The host device requests that namespace (1311) have a size (1331). In allocating blocks to namespace (1311), the controller selects one or more blocks. These selected blocks can be a combination of full blocks and partial blocks (e.g., the full and partial blocks discussed above). Each of the full blocks has a predetermined size (1333).

As illustrated in FIG. 13, full blocks (1321, . . . , 1323) are allocated to namespace (1311) by the controller. However, this allocation leaves a difference (1313) between the requested size (1331) and the total number of full blocks allocated to namespace (1311).

In order to handle the allocation to namespace (1311) that is associated with size difference (1313), the controller determines a next block (1327) to allocate to namespace (1311). The next block (1327) can be either a full block or a partial block. Allocation of next block (1327) to namespace (1311) completes the allocation corresponding to the requested size for namespace (1311). In typical cases, the next block (1327) has a size that is greater than difference (1313). Thus, allocation of next block (1327) leaves a remaining portion (1315) that is not allocated to namespace (1311).

In one example, a portion of the next block (1327) corresponding to difference (1313) is allocated to namespace (1311) as a partial block. The allocated partial block is identified by a partial block identifier. In one example, the partial block identifier is added to namespace map (273) of FIG. 4.

In one example, the allocated partial block is identified by partial block identifier 147 of namespace map 135 as illustrated in FIG. 8. The allocated full blocks (1321, ..., 1323) are identified by full block identifiers (141, ..., 143) of FIG. 8.

Namespace 111 of FIG. 7 is an example of namespace (1311). L-Blocks (121 ... 123) are an example of full blocks (1321, ..., 1323). L-Block (127) is an example of next block (1327).

In some embodiments, remaining portion (1315) is added to a free block pool as a new partial block available for allocation to other name spaces. Alternatively, remaining portion (1315) can be added to an existing partial block. In one example, remaining portion (1315) is added as a partial block to free block pool (160) of FIG. 10, or to free list (275) of FIG. 4. In one example, the new partial block is identified by partial block identifier (151) of FIG. 9.

In one example, a storage device includes non-volatile storage media having a storage capacity. The storage capacity is divided into blocks of the same predetermined size, except that the last block has a size smaller than the predetermined block size. An administrative manager (e.g., executed by controller 107) can virtually expand the last block to include a virtual capacity. Since the virtual capacity is not available for allocation to any namespace, the administrative manager puts the free usable portion of the last block in a free block pool as an available partial block. In some cases, this available partial block can be selected as the next block (1327) to allocate as described above.

In one example, the storage capacity is capacity (220) of FIG. 11. The available partial block corresponds to the free portion of the last block (239).

Figure 14:
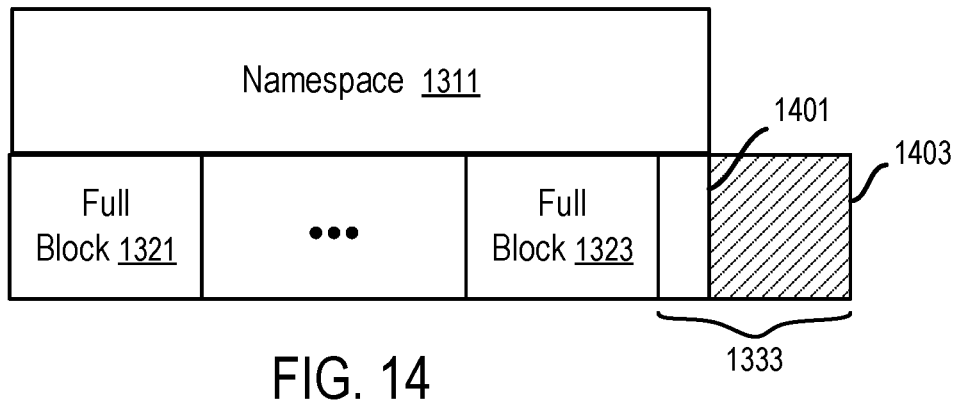
FIGS. 14-16 illustrate examples of allocating a next block to a namespace using full and partial blocks selected from a free block pool according to various embodiments.
Figure 15:
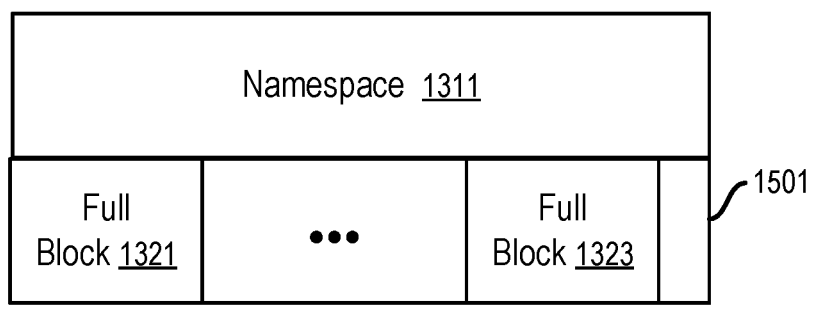
Figure 16:
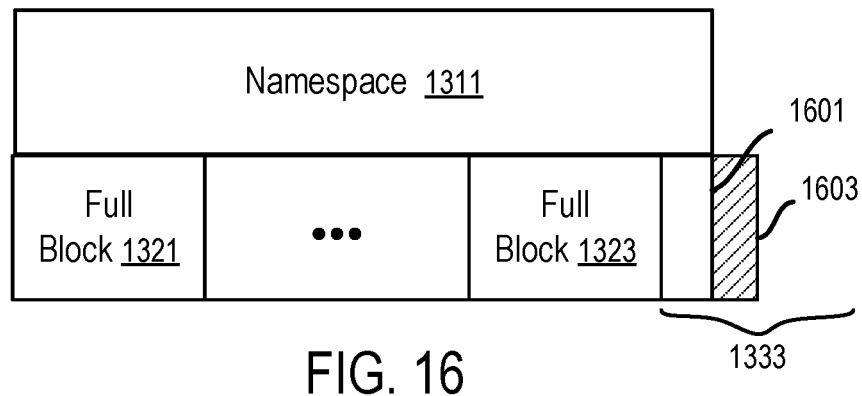

FIGS. 14-16 illustrate examples of allocating next block (1327) to namespace (1311) using full and partial blocks selected from a free block pool according to various embodiments. In FIG. 14, a controller determines that next block (1327) is a full block (having predetermined size 1333) that is selected by the controller from a free block pool. The controller allocates portion (1401) to namespace (1311). Portion (1401) corresponds to difference (1313) of FIG. 13. As a result of this allocation, remaining portion (1403) is unallocated.

In one embodiment, remaining portion (1403) is added as a new partial block to the free block pool. Alternatively, remaining portion (1403) is added to an existing partial block in the free block pool. Optionally, the remaining portion (1403) can be added to other partial blocks (e.g., contiguous partial blocks) in the free block pool to create a full block, such as described above.

In one embodiment, instead of allocating only portion (1401), the controller can determine to over-provision namespace (1311) by allocating all of the full block to namespace (1311), such that portions (1401) and (1403) (the full block) is allocated, leaving no remaining portion. In some cases, the controller may implement a policy of over-provisioning as long as full blocks are available in the free block pool. This over-provisioning can be beneficial in reducing complexity and performance impact by maintaining block alignment. As a result, aligned mapping can be done using simpler computation algorithms, and thus have improved performance and consistency.

In one example of over-provisioning, if a new namespace has a requested size of 1 GB, then 2 GB can be allocated to the new namespace. The functionality of the namespace is not limited by the extra 1 GB allocation. If the namespace subsequently needs to expand to 2 GB (e.g., as determined by the host), no further allocation by the SSD is required, because the 2 GB has already been allocated. Alternatively, if there is a need to use the extra 1 GB for allocation to another namespace, the over-provisioning can be ended. Then, the extra 1 GB can be harvested back from ending the over-provisioning and used for the other namespace (e.g., by adding the harvested space as an available partial block in the free block pool).

In FIG. 15, the controller determines that next block (1327) is partial block (1501) (of size less than predetermined size (1333), but of size equal to difference (1313)) that is selected by the controller from a free block pool. The controller allocates all of partial block (1501) to namespace (1311). Thus, partial block (1501) exactly completes the allocation to namespace (1311). As a result of this allocation, there is no remaining portion to manage.

In one embodiment, the controller operates so that a partial block (e.g., partial block 1501) is only selected as the next block only after the controller determines that no full blocks remain in the free block pool after the allocation of full blocks (1321, ..., 1323) (the allocation of these full blocks leaves difference (1313) that still needs allocation by a next block).

In FIG. 16, the controller determines that next block (1327) is a partial block having portions (1601) and (1603). The partial block is of size less than predetermined size (1333), but of size greater than difference (1313). The partial block is selected by the controller from a free block pool. The controller allocates portion (1601) to namespace (1311). As a result of this allocation, remaining portion (1603) is unallocated. Remaining portion (1603) can be added to the free block pool, such as described above.

In one embodiment, as discussed above, the controller can operate so that a partial block is only selected as the next block after the controller determines that no full blocks remain in the free block pool after the allocation of full blocks (1321, ..., 1323).

In one embodiment, the controller can determine that more than one next block can be used. In one example, the controller identifies two partial blocks in the free block pool. These two partial blocks are allocated to namespace (1311). In one example, after allocation of two or more partial blocks, there is a remaining portion of at least one of the partial blocks. This remaining portion(s) can be handled as described above.

In one embodiment, a device (e.g., storage device 103) includes a host interface, a controller, non-volatile storage media, and firmware containing instructions which, when executed by the controller, instruct the controller to at least: maintain a free block pool including one or more full free blocks having a same predetermined block size (e.g., 1333), and a partial block having a size smaller than the predetermined block size; receive, via the host interface, a request from a host to allocate a namespace having a requested size; in response to the request, determine that the free block pool has a total number of full free blocks that is smaller than the requested size; allocate the total number of full free blocks to the namespace; determine that the size of the partial block is equal to or greater than a difference (e.g., 1313) between the requested size and a size of the allocated full free blocks; and allocate the partial block to the namespace (e.g., next block (1327) is the allocated partial block selected by the controller from the free block pool).

In one embodiment, the instructions further instruct the controller to update the partial block in the free block pool to represent a remaining portion (e.g., 1603) of the partial block that is not allocated for the namespace.

In one embodiment, the instructions further instruct the controller to virtually expand the partial block to include a virtual capacity, wherein a sum of the difference, a size of the remaining portion, and a size of the virtual capacity is equal to the predetermined block size.

In one embodiment, the virtual capacity is not available for allocation to any namespace.

In one embodiment, a total capacity of the non-volatile storage media is not a multiple of the predetermined block size.

In one embodiment, a device (e.g., storage device 103) includes: a host interface; a controller; non-volatile storage media; and firmware containing instructions which, when executed by the controller, instruct the controller to at least: maintain a free block pool including full blocks (e.g., full blocks 1321 . . . 1323) having a same predetermined block size, and a partial block having a size smaller than the predetermined block size; receive, via the host interface, a request from a host to allocate a namespace (e.g., 1311) having a requested size (e.g., 1331); in response to the request, allocate a number of full blocks to the namespace, wherein a difference between the number of full blocks and the requested size is less than the predetermined block size; determine a next block (e.g., 1327) to allocate from the free block pool, wherein the next block is one of the full blocks or the partial block; and allocate the determined next block to the namespace.

In one embodiment, the determined next block is the partial block, and determining the next block to allocate includes determining that the size of the partial block (e.g., sum of 1601 and 1603) is greater than the difference.

In one embodiment, the determined next block is the partial block, and determining the next block to allocate includes determining that the size of the partial block (e.g., 1501) is equal to the difference.

In one embodiment, the determined next block is the partial block; determining the next block to allocate includes determining that the size of the partial block is greater than the difference; and allocating the partial block leaves a remaining unallocated portion (e.g., 1603) of the partial block.

In one embodiment, the determined next block is a first full block of the full blocks, and wherein allocating the next block leaves a remaining unallocated portion (e.g., 1403) of the first full block.

In one embodiment, the partial block is a first partial block, and the instructions further instruct the controller to add the remaining unallocated portion of the first full block to the free block pool as a second partial block.

In one embodiment, determining the next block to allocate includes: determining that no full blocks remain in the free block pool after the number of full blocks is allocated; and in response to determining that no full blocks remain in the free block pool, selecting the partial block as the next block.

In one embodiment, each of the allocated full blocks is represented in a namespace map by an identification of a starting unit.

In one embodiment, the allocated next block is represented in the namespace map by an identification of a unit allocated for the namespace and a chunk size.

In one example, an SSD has 15 GB and the full block size is 2 GB. The first 2 GB of SSD can be allocated as a block; the second 2 GB can be allocated as another block, etc. These blocks are aligned and can be used efficiently. Since the SSD has only 15 GB (which is not a multiple of the full block size), after 7 full blocks are allocated, only 1 GB is remains in the SSD. This is a partial block (because of size less than 2 GB). In one example, the controller can manage the partial block as a virtual 2 GB block (over-provisioning), but only 1 GB is actually available.

In one example, if a namespace has a requested size of only 7 GB, then allocating 4 full blocks to the namespace can waste an extra 1 GB space (allocated to the namespace but not used). If instead, a partial block of 1 GB is allocated to the namespace, the extra 1 GB can be used for another namespace (if the SSD is running out of available full blocks, or another namespace requests 5 GB and the 1 GB partial block can fit exactly).

In one example, alternatively, if a namespace wants 7 GB, the SSD simply allocates 4 blocks of 2 GB to the namespace (over-provisioning). However, when there are only 3 blocks of 2 GB left in the SSD, and the last chunk of the SSD is 1 GB, allocating the last chunk to the namespace fits exactly.

In some cases, for example, the last chunk may not be exactly the same size as the partial block needed by the namespace. For example, the block size is 4 GB, and the last chunk of 15 GB SSD is 3 GB (e.g., added as a partial block in a free block pool). If the namespace requested size is 6 GB, the 3 GB chunk can meet the requirement of a 2 GB partial block needed for the namespace.

In one example, a namespace is created for an SSD. The SSD has a storage capacity of 14 GB, and a namespace of XGB is created. Thus, XGB out of the 14 GB is allocated to the namespace. A logical block addressing (LBA) address in the namespace needs to be translated into the address in the SSD. The XGB is not necessarily contiguous on the SSD. For example, the first half of the namespace may be physically on the first X/2 GB on the SSD; and the next few Y GB may have previously been allocated to another namespace, and not available. Thus, the second half of the namespace may be physically on the SSD starting at X/2+Y GB. An L-block can be used to simplify the computation in mapping the LBA address in the namespace into the physical address in the SSD. If the L-block size is reduced, the mapping table can become too large, complicated, and/or less efficient. If the L-block size is increased too much, the flexibility in remapping physical addresses of the SSD to LBA addresses in namespaces is reduced.

In one example, the size of an SSD is not aligned with the full block size. The SSD has 14 GB, and the full block size is selected to be 3 GB. The SSD can be divided into 4 full blocks (each 3 GB). Mapping of addresses within each of the 4 full blocks and corresponding blocks of addresses assigned to namespaces is efficient. The last chunk of 2 GB is not a full block. This last chunk can be managed as a partial block as described above. For example, if a namespace has a requested size of 5 GB, then allocating 1 full block (3 GB) and this last chunk of 2 GB is an exact fit to the requested size. However, if there is another full block available, the last chunk can be saved for later use at a time when no other block is available. If a namespace has a requested size of 6 GB, then the last chunk is saved for later use. In one example, this last chunk is entered into a list of free partial blocks, such as described above.

Figure 17:
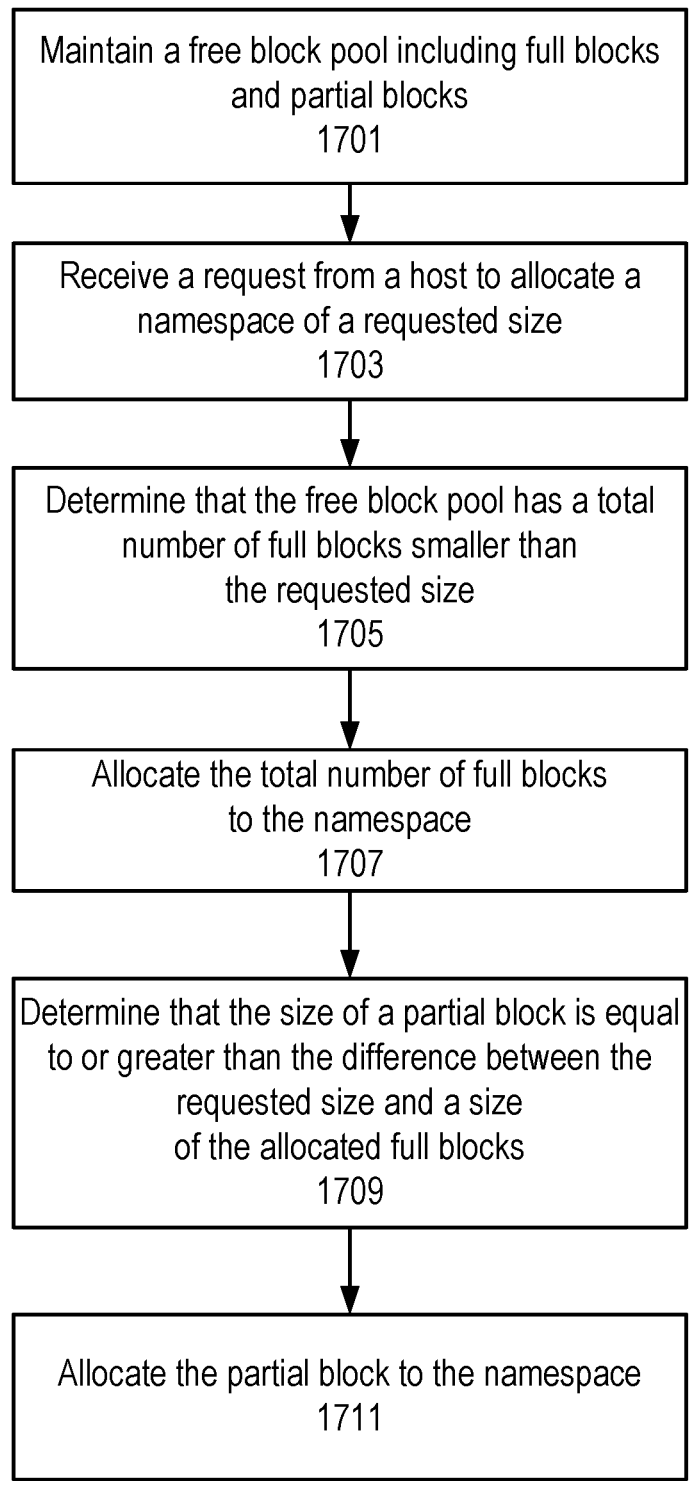
FIG. 17 shows a method to select blocks from a free block pool for allocation to a namespace on a storage device according to one embodiment.

FIG. 17 shows a method to select blocks from a free block pool for allocation to a namespace on a storage device according to one embodiment. For example, the method of FIG. 17 can be implemented in the system of FIG. 1.

The method of FIG. 17 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 17 is performed at least in part by one or more processing devices (e.g., controller 107 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1701, a free block pool is maintained. The free block pool includes full blocks and partial blocks. In one example, the free block pool includes, prior to allocation to any namespace, full blocks (1321 . . . 1323) and next block (1327).

At block 1703, a request is received from a host to allocate a namespace of a requested size. In one example, namespace (1311) has a requested size (1331).

At block 1705, a determination is made that the free block pool has a total number of full blocks smaller than the requested size. In one example, the total number of full blocks is smaller than the requested size by difference (1313).

At block 1707, the total number of full blocks is allocated to the namespace.

At block 1709, a determination is made that the size of at least a first partial block of the partial blocks in the free block pool is equal to or greater than the difference between the requested size and the total size of the allocated full blocks.

At block 1711, the first partial block is selected and allocated to the namespace. In one example, partial block (1501) is allocated. In one example, the partial block having portions (1601), (1603) is allocated. In one example, the namespace is over-provisioned by allocating both portions (1601), (1603) to the namespace. In an alternative example, remaining portion (1603) is retained in the free block pool as part of a partial block available for allocation to another namespace.

Figure 18:
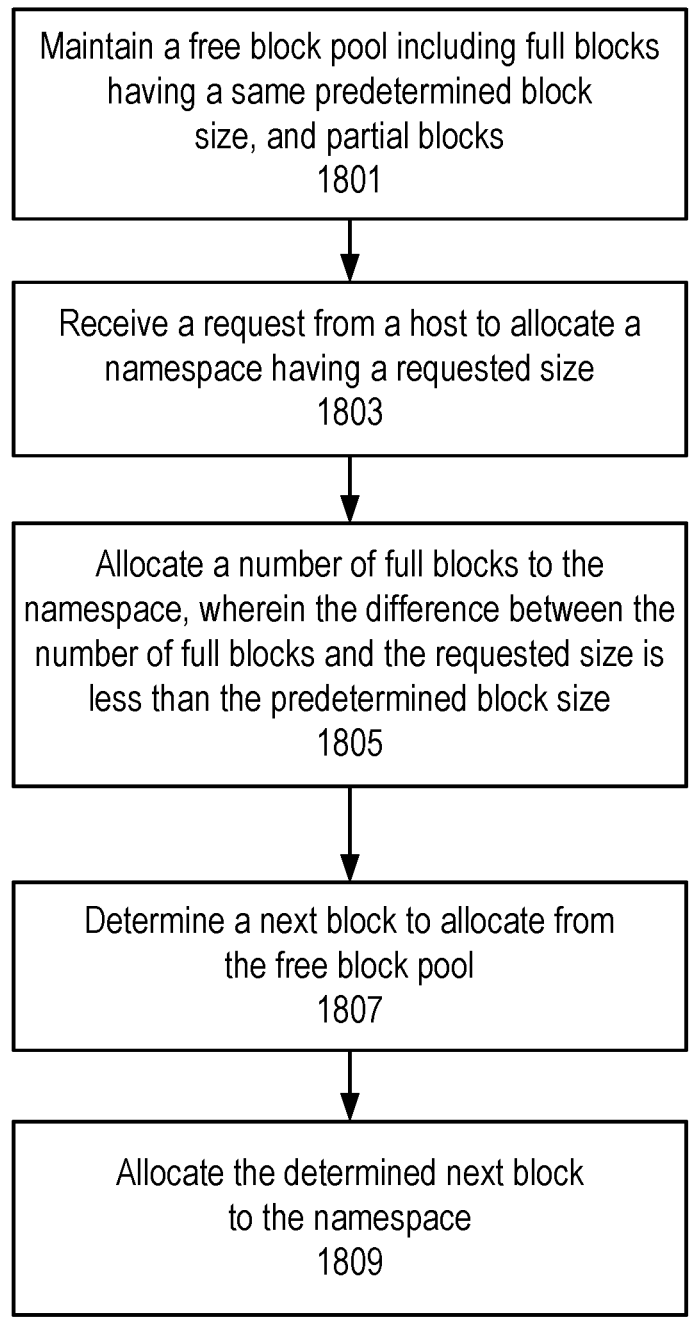
FIG. 18 shows a method to determine a next block to allocate to a namespace on a storage device according to one embodiment.

FIG. 18 shows a method to determine a next block to allocate to a namespace on a storage device according to one embodiment. For example, the method of FIG. 18 can be implemented in the system of FIG. 1.

The method of FIG. 18 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 18 is performed at least in part by one or more processing devices (e.g., controller 107 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1801, a free block pool is maintained. The free block pool has full blocks of a predetermined block size, and also has partial blocks.

At block 1803, a request is received from a host to allocate a namespace having a requested size. In one example, the request is for a namespace (1311) having requested size 1331.

At block 1805, a number of full blocks is allocated to the namespace. The difference between a total size of the number of full blocks and the requested size is less than the predetermined block size. In one example, full blocks (1321 . . . 1323) are allocated to the namespace.

At block 1807, a determination is made of a next block to allocate from the free block pool. In one example, next block (1327) is selected from the free block pool. In one example, controller (107) determines the next block in response to determining that the number of full blocks allocated to the namespace does not align with requested size (1331). Thus, allocation of a partial block is needed to fully cover the namespace.

At block 1809, the determined next block is allocated to the namespace. In one example, controller (107) selects the next block based on the size of the difference (1313). In one example, controller (107) selects the next block based on a comparison of the size of the difference (1313) to at least one size of the full and/or partial blocks available in the free block pool.

In one embodiment, a method includes: maintaining a free block pool including full blocks having a same predetermined block size, and a partial block having a size smaller than the predetermined block size; receiving a request from a host to allocate a namespace having a requested size (e.g., 1331); in response to the request, allocating a number of full blocks (e.g., 1321 . . . 1323) to the namespace, wherein a difference between the number of full blocks and the requested size is less than the predetermined block size; determining a next block (e.g., 1327) to allocate from the free block pool, wherein the next block is one of the full blocks or the partial block; and allocating the determined next block to the namespace.

In one embodiment, the request to allocate the namespace is in accordance with a Non-Volatile Memory Host Controller Interface Specification (NVMHCI).

In one embodiment, the method further includes converting, using a namespace map, logical addresses in the namespace to physical addresses in non-volatile memory, wherein the logical addresses are associated with read or write requests from the host.

In one embodiment, the non-volatile memory is configured in a solid state drive.

In one embodiment, the method further includes generating, by a controller in response to the request, the namespace map, wherein the namespace map identifies the allocated full blocks, and the allocated next block.

In one embodiment, each of the allocated full blocks is represented in the namespace map by an identification of a starting unit, and the allocated next block is represented in the namespace map by an identification of a unit allocated for the namespace and a chunk size.

In one embodiment, the method further includes: receiving a request from the host to delete the namespace; and adding the next block identified in the namespace to the free block pool.

In one embodiment, a non-transitory computer-readable storage medium stores instructions which, when executed by a controller of a computer storage device, cause the controller to: maintain a free block pool including full blocks having a same predetermined block size, and a partial block having a size smaller than the predetermined block size; receive a request from a host to allocate a namespace having a requested size; in response to the request, allocate a number of full blocks to the namespace, wherein a difference between the number of full blocks and the requested size is less than the predetermined block size; determine a next block to allocate from the free block pool, wherein the next block is one of the full blocks or the partial block; and allocate the determined next block to the namespace.

In one embodiment, determining the next block to allocate includes determining that the size of the partial block is equal to or greater than the difference.

In one embodiment, determining the next block to allocate includes determining that the size of the partial block is greater than the difference, and allocating the next block leaves a remaining unallocated portion of the partial block.

In one embodiment, the determined next block is a first full block of the full blocks, and allocating the first full block leaves a remaining unallocated portion of the first full block.

After an initial block size is used to define L-blocks for namespace mapping, an improved or optimized block size may be subsequently predicted or calculated, e.g., using an artificial intelligence technique and/or machine learning from the namespace usage histories in the storage device and/or other similarly used storage devices.

To apply a new block size for namespace mapping, the storage device regenerates the namespace maps for the existing namespaces to perform block-wise mapping according to the new block size. Preferably, the namespace maps are regenerated according to the new block size for efficient translation from logical addresses defined in the namespaces to logical addresses defined in a namespace-neutral way for the entire capacity of the storage device so that the translated logical addresses can be converted to physical addresses independent of namespaces.

Preferably, the new block size is a multiple of the old block size for block size increase; and the old block size is a multiple of the new block size for block size decrease. More preferably, each of the new and old block sizes is a power of two (2) to simplify computations involved in mapping of addresses for the L-blocks. A closest number that meets the preferences can be selected as the new block size.

When the new block size is a multiple of the old block size, multiple adjacent full L-blocks of the old block size can be combined into one full L-block of the new block size to implement block size increase.

When the old block size is a multiple of the new block size, each full L-block of the old block size can be split into multiple full L-blocks of the new block size to implement block size decrease.

When an L-block of the new block size is only partially allocated to an existing namespace, a partial L-block allocated from the L-block of the new block size can be initially identified and used in the new namespace map of the existing namespace. Subsequently, a namespace map optimization operation can be performed in the background to reduce the number of partial L-blocks allocated to the namespace and/or consolidate L-blocks allocated to the namespace in a contiguous region.

In general, changing the block size may increase the number of partial blocks in the updated namespace map of an existing namespace, from no more than one, to more than one. Optionally, a background process can be used to optimize the updated namespace maps generated according to the new block size and reduce the number of partial blocks to no more than one. In one example, the optimization can be performed to reduce the number of partial blocks, consolidate L-blocks that are allocated to a same namespace in a contiguous region of logical addresses defined in the capacity of the storage device, and/or consolidate free L-blocks in a continuous region of logical addresses defined in the capacity of the storage device.

Preferably, a background process of optimization is performed before the application of the new block size to namespace mapping, to move the position of full and/or partial L-blocks that are allocated to an existing namespace in the capacity of the storage device and to at least reduce the increase in the number of partial blocks caused by applying the new block size. For example, the L-blocks of the old block size allocated to a namespace can be adjusted such that the logical addresses in the L-blocks are the same as the logical addresses in L-blocks of the new block size after the optimization is applied to the new namespace. For example, the optimized L-blocks of the new block size can be calculated before applying the new block size to determine the preferred L-blocks of the old block size; and after adjusting the namespace map of the namespace to the preferred L-blocks of the old block size, the new block size can be applied to map the namespace to the optimized L-blocks of the new block size.

Figure 19:
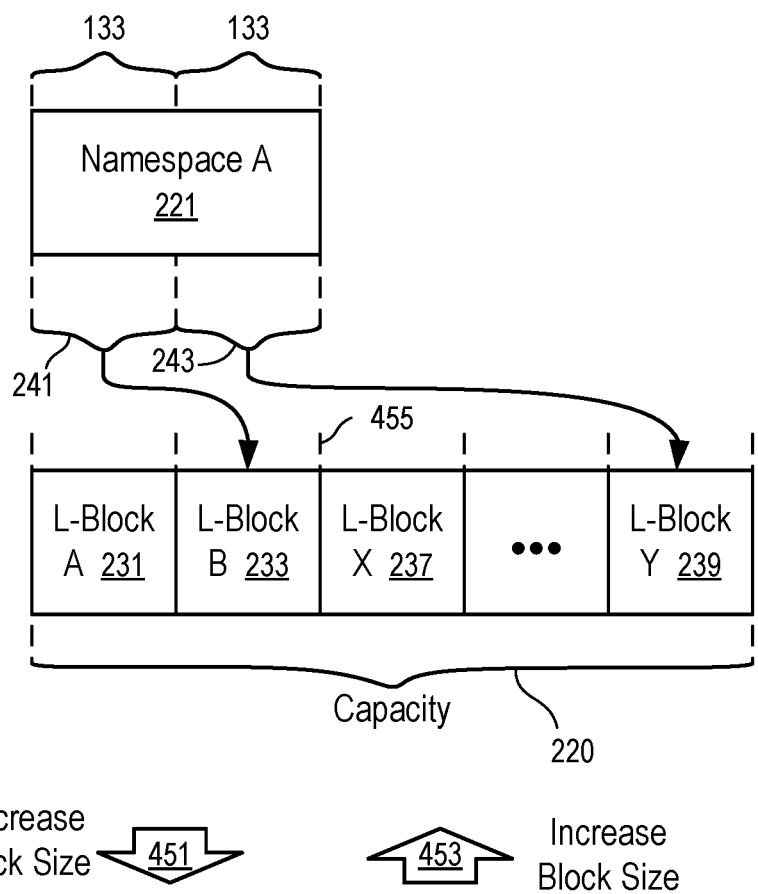
FIG. 19 illustrates block size changes for namespace mapping.
Figure 19:
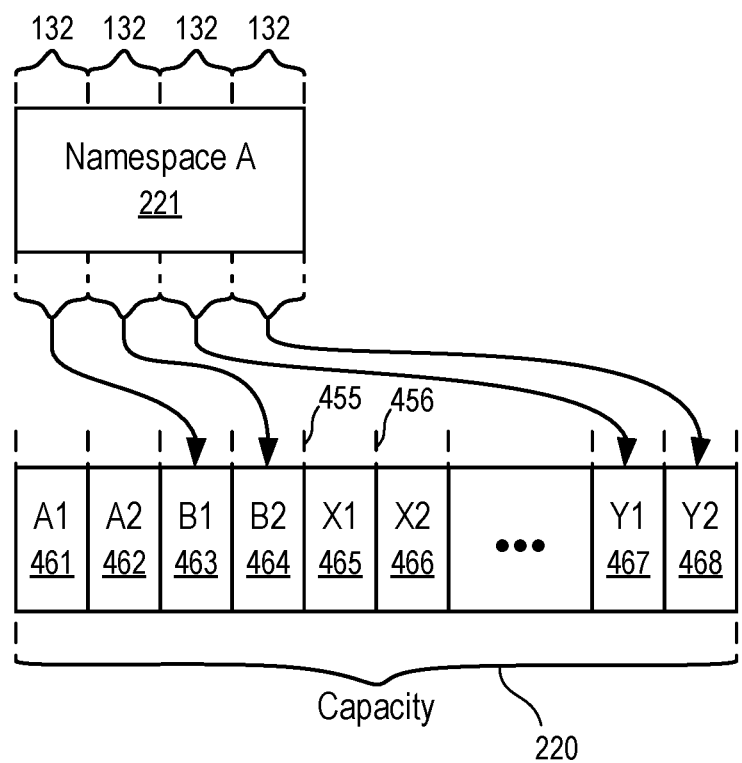

FIG. 19 illustrates block size changes for namespace mapping.

In FIG. 19, a large block size (133) is a multiple of a small block size (132). The capacity (220) of the storage device (103) is divided into a set of large L-blocks (231, 233, 237, . . . , 239) according to the large block size (133) and divided into another set of small L-blocks (461, 462, 463, 464, 465, 466, . . . , 467, 468) according to the small block size (132).

In decreasing (451) from the large block size (133) to the small block size (132), the block boundaries (e.g., 455) between adjacent large L-blocks (231, 233, 237, . . . , 239) remain as some of the block boundaries of adjacent small L-blocks (461, . . . , 468). Additional block boundaries (e.g., 456) are added to further split the large L-blocks (231, 233, 237, . . . , 239) into the small L-blocks (461, . . . , 468).

In increasing (453) from the small block size (132) to the large block size (133), some of the block boundaries of adjacent small L-blocks (461, . . . , 468) remain as the block boundaries (e.g., 455) between adjacent large L-blocks (231, 233, 237, . . . , 239). Other block boundaries (e.g., 456) are removed to combine adjacent small L-blocks (461, . . . , 468) into the respective large L-blocks (231, 233, 237, . . . , 239).

When the capacity (220) is divided according to the large block size (133), the namespace (221) in FIG. 19 is mapped to a set of full large L-blocks (233 and 239). Since the set of logical addresses in the full large L-blocks (223 and 239) is the same as the set of logical addresses in the full small L-blocks (463, 464, 467 and 468), the namespace map of the namespace (221) can be simply updated, from mapping to full large L-blocks (233 and 239), to mapping to full small L-blocks (463, 464, 467 and 468) to implement the block size decrease (451). Similarly, to implement the block size increase (453), the namespace map of the namespace (221) can be simply updated, from mapping to full small L-blocks (463, 464, 467 and 468), to mapping to full large L-blocks (233 and 239).

In general, when a large L-block (e.g., 233) that is allocated to a namespace (e.g., 221) is split into multiple small L-blocks (e.g., 463 and 464), the small L-blocks (e.g., 463 and 464) of the small block size (132) are also allocated to the namespace (e.g., 221). Thus, the update of the namespace map for the namespace (e.g., 221) for the block size decrease (451) is simplified for the allocated full blocks (e.g., 233).

However, when multiple small L-blocks (e.g., 463 and 464) are combined into a large L-block (e.g., 233) in block size increase (453), there can be instances where some of the multiple small L-blocks (e.g., 463 and 464) are allocated to the namespace (e.g., 221) and some of the multiple small L-blocks (e.g., 463 and 464) are not allocated to the namespace (e.g., 221). As a result, the L-block (e.g., 233) is only partially allocated to the namespace (e.g., 221).

For example, when the small block size (132) is used, the namespace (221) may be mapped to L-blocks (464 and 465), instead of L-blocks (463 and 464). L-block (463) may be a free block, or mapped to another namespace (e.g., 223). In such a situation when L-blocks (463 and 464) are merged as a large L-block (233) and L-blocks (465 and 466) are merged as a large L-block (237) after the block size increase (453), the namespace (221) is mapped to a portion of the large L-block (233) and a portion of the large L-block (237).

Optionally, before the block size increase (453), the namespace map of the namespace (221) is adjusted (e.g., through a background process for optimization) to remap the namespace (221) such that the small full L-blocks used by the namespace (221) are consolidated according to the large L-blocks defined according to the large block size (133). For example, instead of using small L-blocks (464 and 465) that are in different large L-blocks (233 and 237), the namespace (221) can be remapped to use small L-blocks (463 and 464) that are in one large L-block (223). After the remapping operation, the number of large L-blocks that are partially used by the namespace (221) as a result of the block size increase (453) is reduced.

FIG. 19 illustrates an example where the size of the namespace (221) is both a multiple of the small block size (132) and a multiple of the large block size (133). Thus, it is possible to remap the namespace (221) to the small L-blocks (463, 464, 467, and 468) such that after the block size increase (453), the namespace (221) is not mapped to a large L-block that is only partially used by the namespace (221).

However, when the size of the namespace (221) is not both a multiple of the small block size (132) and a multiple of the large block size (133), the namespace (221) uses at least one large L-block that is only partially used by the namespace (221). A partial L-block can be allocated from the partially used large L-block and used in the namespace (221), using the technique discussed above in connection with FIGS. 7-10.

In some implementations, a background optimization of the namespace map of the namespace (221) is performed before the block size change (453) such that after the block size increase (453), the namespace (221) uses no more than one partial L-block allocated from the large L-blocks (231, 233, 237, ..., 239).

Optionally or in combination, the optimization can be performed after the block size increase (453). For example, when the namespace (221) uses small L-blocks (464 and 465) that are portions of large L-blocks (223 and 227), two partial L-blocks can be initially allocated from the large L-blocks (223 and 227) for the namespace (221) to implement the block size increase (453). Subsequently, the partial L-blocks allocated to the namespace (221) can be remapped to one large L-block (e.g., 223). Optionally, the optimized namespace map that uses the large L-block (e.g., 223) is pre-calculated before the actual block size increase (453) to determine the corresponding optimized namespace map that uses the small L-blocks (e.g., 463 and 464) generated from splitting the large L-block (e.g., 223) used in the optimized namespace map. A background optimization process can then be applied to change from the current namespace map of the namespace (221) to the optimized namespace map, before the block size increase (453).

FIGS. 20-23 illustrate namespace mapping adjustments in implementing block size changes.

Figure 20:
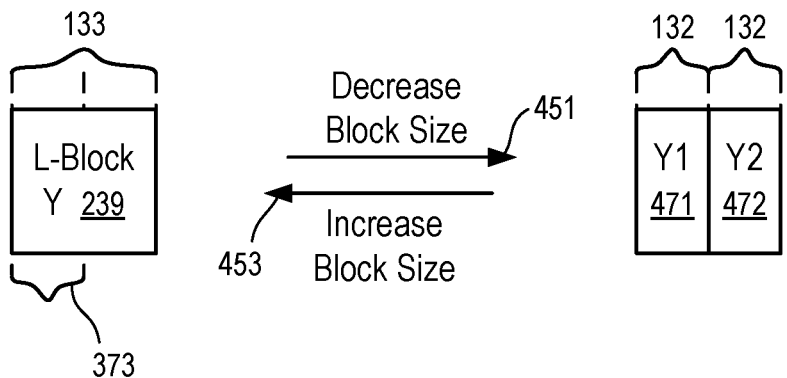
FIGS. 20-23 illustrate namespace mapping adjustments in implementing block size changes.

In FIG. 20, a large L-block (239) has a portion (373) that is allocated to a namespace (e.g., 221) as a partial block (373) before the block size decrease (451). Since the partial block (373) corresponds to a full small L-block (471) having the small block size (132), the full small L-block (471) is allocated to the namespace (e.g., 221) after the block size decrease (451). Thus, the use of a partial block is eliminated for the namespace (e.g., 221) after the block size decrease (451).

When the adjacent small L-blocks (471 and 472) are merged into the large L-block (239) for the block size increase (453), the large L-block (239) may be only partially allocated to the namespace (e.g., 221), as illustrated in FIG. 20. For example, in a situation where one small L-block (471) is allocated to the namespace (e.g., 221) and another small L-block (472) is allocated to another namespace (e.g., 223), or is free for allocation to another namespace (e.g., 223), a partial block (373) is allocated from the large L-block (239) for the namespace (e.g., 221) after the block size increase (453).

Figure 21:
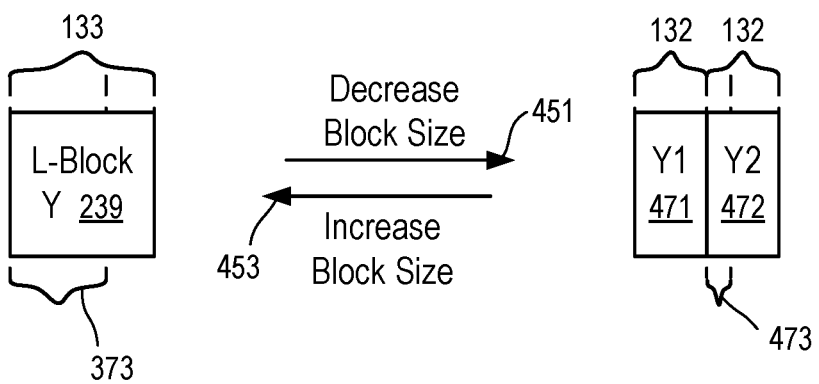

FIG. 21 illustrates a situation where a partial L-block (373) allocated to a namespace (e.g., 221) is divided into a full small L-block (471) and a partial L-block (473) allocated from an adjacent small L-block (472) after the block size decrease (451). To implement the block size decrease (451), the namespace map of the namespace (e.g., 221) is updated to include the full small L-block (471) and the partial L-block (473) allocated from the adjacent full small L-block (472).

In a block size increase (453) in FIG. 21, the partial L-block (473) allocated to a namespace (e.g., 221) is merged with the adjacent L-block (471) to form a partial L-block (373) that is allocated from the large L-block (239) and used in the updated namespace map of the namespace (e.g., 221).

Figure 22:
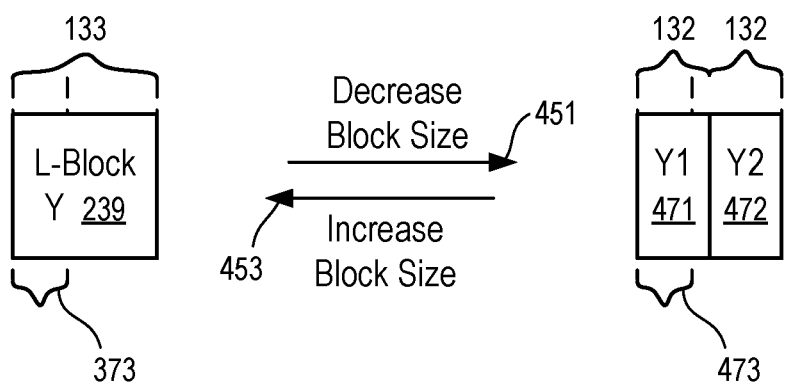

FIG. 22 illustrates a situation where a partial L-block (373) allocated to a namespace (e.g., 221) has a size smaller than the small block size (132). After the block size decrease (451), the portion (373) of the large L-block (239) allocated to the namespace (e.g., 221) is still a portion (473) of a small L-block (471). Thus, a partial L-block (473) is allocated from the small L-block (471) to the namespace (e.g., 221) after the block size decrease (451); and the namespace map of the namespace (e.g., 221) is updated accordingly to implement the block size decrease (451).

In a block size increase (453) in FIG. 21, a partial L-block (373) is allocated from the large L-block (239) for the namespace (e.g., 221), after the small L-blocks (471 and 472) are merged as the large L-block (239).

Figure 23:
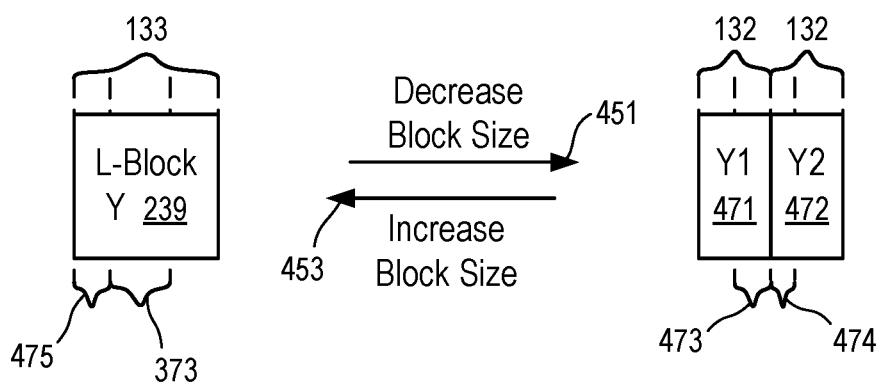

FIG. 23 illustrates a situation where a partial L-block (373) allocated from a large L-block (239) is split into two partial L-blocks (473 and 474) after the block size decrease (451). In FIG. 23, none of the boundaries of the partial block (373) allocated to a namespace (e.g., 221) is aligned with the boundaries of the large L-block (239) and the boundaries of the small L-blocks (471 and 472). Since the partial block (373) spans across a boundary between the small L-blocks (471 and 472), two partial L-blocks (473 and 474) are allocated from small L-blocks (471 and 472) to the namespace (e.g., 221) as a result of the block size decrease (451). In FIG. 23, the portion (475) of the L-block (239) may be allocated to another namespace (e.g., 223) or have been freed from another namespace (e.g., 223). Optimization can be performed after the block size decrease (451) to reduce the number of partial blocks assigned to the namespace (e.g., 221).

Alternatively, before the block size decrease (451), optimization is performed for the partial block (373) allocation from the large L-block (239) such that at least one of the boundary of the partial block allocated to the namespace (e.g., 221) is aligned with some of: the boundaries of the large L-block (239), and the boundaries of the small L-blocks (471 and 472). When such an optimization is performed, the block size decrease (451) does not cause the partial L-block (373) of the namespace (e.g., 221) to be split into more than one partial L-block allocated from small L-blocks (e.g., 471, 472).

Figure 24:
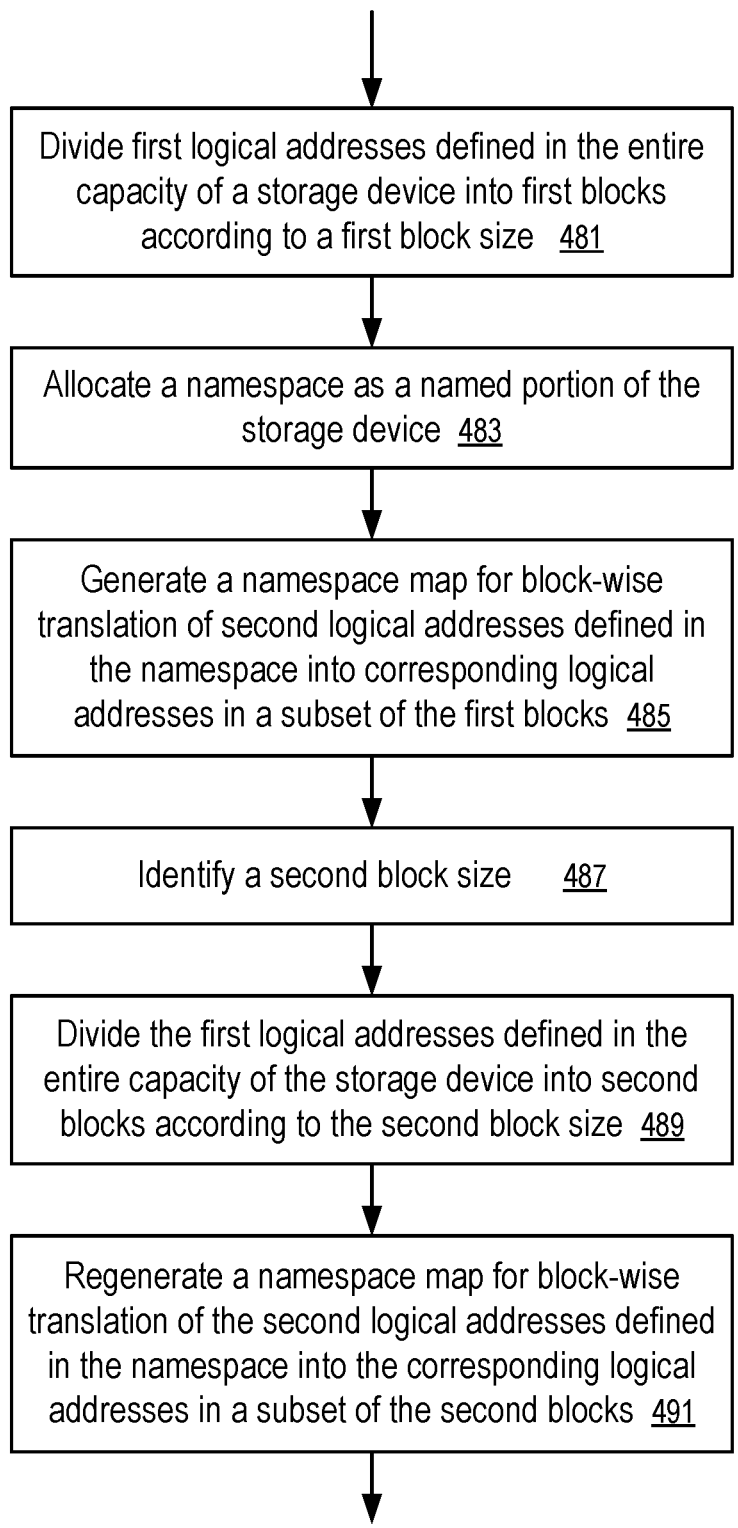
FIG. 24 shows a method to adjust a block size for namespace mapping.

FIG. 24 shows a method to adjust a block size for namespace mapping. For example, the method of FIG. 24 can be implemented in a storage device (103) illustrated in FIG. 1 with namespace map adjustments illustrated in FIGS. 19-23.

The method of FIG. 24 includes: dividing (481) a set of first logical addresses defined in the entire capacity (220) of a storage device (103) into first blocks (231, 233, 237, ..., 239) according to a first block size (133); allocating (483) a namespace (221) as a named portion of the storage device (103); generating (485) a namespace map (e.g., 273, 135) for block-wise translation of a set of second logical addresses defined in the namespace (221) into logical addresses in a subset (e.g., 233, 239) of the first blocks (231, 233, 237, ..., 239); identifying (487) a second block size (132); dividing (489) the set of first logical addresses defined in the entire capacity (220) of the storage device (103) into second blocks (461, ..., 468) according to the second block size (132); and regenerating (491) a namespace map (e.g., 273, 135) for block-wise translation of the second logical addresses defined in the namespace (221) into the corresponding logical addresses in a subset (e.g., 463, 464, 467, 468) of the second blocks (461, ..., 468) of the first logical addresses defined in the entire capacity (220) of the storage device (103).

Preferably, the second block size is determined to be a power of two (2); if the second block size is smaller than the first block size, the first block size is a multiple of the second block size; and if the second block size is larger than the first block size, the second block size is a multiple of the first block size.

Preferably, the namespace map of the namespace is optimized before or after the block size change to reduce the number of partial blocks used in the namespace map after the block size change.

Various embodiments related to changing block size (e.g., block size 133) are now described below. At least some embodiments relate to selection of a new block size (e.g., dynamic selection based on a current operational context for a storage device, such as operating temperature). The generality of the following description is not limited by the various embodiments described above.

For improved and/or consistent performance in address mapping, storage spaces allocated to namespaces are managed using blocks of a predetermined size.

For a given size of blocks (e.g., a predetermined block size) used to manage namespace address mapping, increasing the storage capacity of a storage device leads to an increased number of blocks, and thus finer granularity in the blocks relative to the storage capacity. Reducing granularity can increase the cost in implementing address mapping.

As mentioned above, when the block size (e.g., 133) is reduced, the flexibility of the system in dynamic namespace management increases. However, a reduced block size (133) also increases the number of blocks to be mapped, which decreases the computation efficiency in address mapping. An optimal block size balances the tradeoff between flexibility and efficiency; and a particular block size can be selected for the specific usage of a given storage device (e.g., 103) in a specific computing environment.

In some cases, storage devices that are not able to dynamically select a block size during the operating life of the storage device are not able to optimize the block size because the context of operation for the storage device significantly changes during use (e.g., due to wear after extended use, and/or a change in ambient environmental conditions such as humidity or ambient chemical composition). For example, a block size that is optimal at the time of initial manufacture (e.g., first bootup) may not be optimal after extended use of the storage device (e.g., due to increased error rates that preclude use of certain portions of a storage media).

In some cases, changes in ambient conditions may cause a prior block size to no longer be optimal. For example, changes in operating temperature may result in a change of the optimal block size. This can cause inefficiency and/or reduction in performance of a storage device.

At least some embodiments described below address the above technical problems by selecting a block size based on the storage capacity of a storage device. In one embodiment, the block size used in managing namespace address mapping is selected based on the storage capacity of the storage device to constrain the granularity within a range. Thus, for a device having a large storage capacity, a large block size is automatically selected to balance flexibility in address mapping and cost in address mapping using the block size.

In some cases, the block size is selected at the time of initial manufacture of a storage device. In other cases, the block size is selected at various times during the life of the storage device. In one example, the storage capacity changes due to a change in temperature. In one example, the storage capacity changes due to portions of a storage media becoming inoperable or unusable (e.g., due to excessive wear). In some cases, the storage capacity changes due to allocations of portions of storage capacity to other uses (e.g., a portion is allocated for use by a different computing device, so that the portion of the storage capacity available for use by a host is reduced).

In one embodiment, a storage device includes: a host interface; a controller; non-volatile storage media having a storage capacity (e.g., a storage capacity determined at the time of initial manufacture); and firmware containing instructions which, when executed by the controller, instruct the controller to at least: select, based on the storage capacity, a block size for allocating blocks to namespaces; receive, via the host interface, a request from a host to create a first namespace; and allocate at least a portion of the blocks to the first namespace.

In one embodiment, a storage device includes: a host interface; a controller; non-volatile storage media; and firmware containing instructions which, when executed by the controller, instruct the controller to at least: receive, via the host interface, a request from a host to create a namespace; allocate blocks of a first block size to the namespace;

increase a storage capacity of the non-volatile storage media (e.g., a storage capacity that increases and/or decreases at various times during use after manufacture); select, based on the increased storage capacity, a second block size for allocating blocks to the namespace, wherein the second block size is greater than the first block size; and allocate blocks of the second block size to the namespace.

In one example, the storage capacity increases due to a change in a programming mode of one or more portions of the storage media. In one example, the programming mode for a portion changes from single-level cell (SLC) programming to triple-level cell (TLC) programming.

Figure 25:
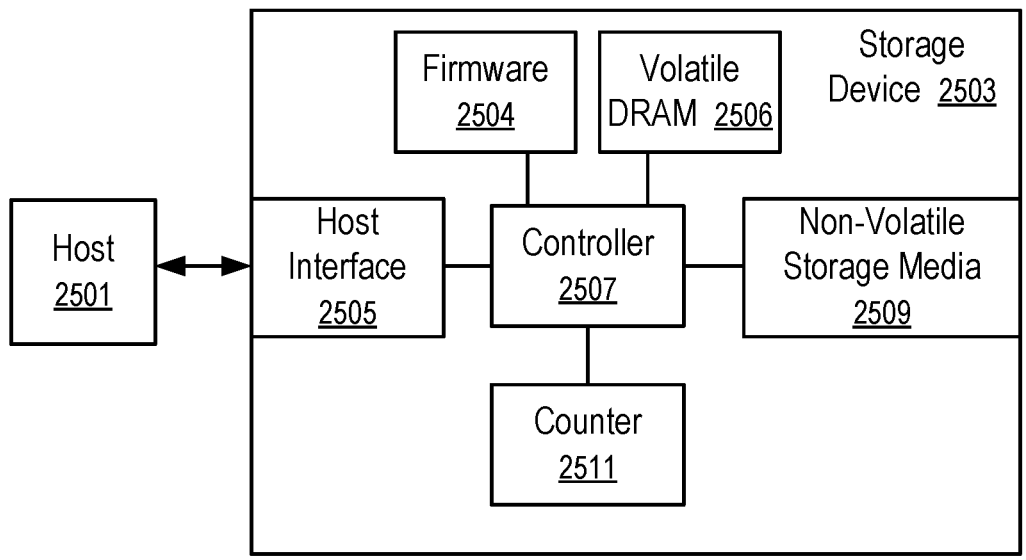
FIG. 25 shows a storage device having a controller used to select block sizes for namespace management according to one embodiment.

FIG. 25 shows a storage device (2503) having a controller (2507) used to select block sizes (e.g., 133) for namespace management according to one embodiment. Storage device (2503) includes host interface (2505), which communicates with host (2501). In one example, storage device (2503) can be implemented similarly as for storage device (103) of FIG. 1.

Controller (2507) processes communications received by host (2505). These communications include various requests from host (2501) to create one or more namespaces. In one example, the created namespaces include Namespace A and Namespace B of FIG. 3. In one example, namespace map (273) of FIG. 4 is updated to indicate blocks allocated to a newly-created namespace.

Controller (2507) selects a block size for allocating blocks to a namespace requested by host (2501). The selected block size can be a new block size that is larger or smaller than the previously-used block size. In one example, the block size increases or decreases (e.g., 451, 453 of FIG. 19) and is implemented similarly as described for FIG. 19.

Controller (2507) executes instructions stored in firmware (2504). In one example, firmware (2504) is similar to firmware 104 of FIG. 1.

Storage device (2503) includes volatile Dynamic Random-Access Memory (DRAM) (2506) for the storage of run-time data and instructions used by the controller (2507) to improve the computation performance of the controller (2507) and/or provide buffers for data transferred between the host (2501) and non-volatile storage media (2509). In one example, non-volatile storage media (2509) is similar to non-volatile storage media (109) of FIG. 1.

Non-volatile storage media (2509) includes memory cells used to store data for access by host (2501). In one example, the memory cells are arranged in various portions of non-volatile storage media (2509). Each of these portions may use a programming mode selected by controller (2507). In one example, the programming mode is a single-level cell mode, or a triple-level cell mode.

Storage device (2503) includes a counter (2511) used by controller (2507) to count quantities of data handled by storage device (2503). In one embodiment, each quantity of data counted by counter (2511) corresponds to a quantity of data written to non-volatile storage media (2509). In one example, counter (2511) counts a quantity of data written to each of various portions of non-volatile storage media (2509). In one example, each of the various portions uses a different programming mode. In this manner, controller (2507) can use counter (2511) to determine an extent of wear for various portions of non-volatile storage media (2509), and use the extent of wear for each portion as an input for selecting a new block size.

In one embodiment, controller (2507) selects a block size for allocating blocks to namespaces during the life of storage device (2503). The block size selected is based on the storage capacity of non-volatile storage media (2509). In one example, controller (2507) determines the storage capacity of non-volatile storage media (2509) during its initial operation (e.g., initial bootup). A process executed by firmware (2504) uses the determined storage capacity as an input for determining an initial block size to use.

In one embodiment, after the initial block size is selected, host interface (2505) receives a request from host (2501) to create a namespace. In response to receiving the request, controller (2507) allocates blocks to the created namespace, wherein each block has the same initial block size. In one example, the initial block size is predetermined block size (133). In one example, each allocated block is an L-Block of namespace map (273) as illustrated in FIG. 4. In one example, a set of L-blocks (231, 233, . . . , 237, 239) from non-contiguous regions of the capacity (220) are allocated to the newly-created namespace (e.g., 221 or 223).

In one embodiment, controller (2507) determines one or more usage characteristics associated with the namespace requested by host (2501). The initial block size is selected at least in part based on the usage characteristic. In one example, the usage characteristic is provided by host (2501). In one example, the usage characteristic is determined by controller (2507) based on a current ability of storage device (2503) to implement physical storage consistent with the usage characteristic. In one example, the usage characteristic is based on an application of host (2501) that will use the newly-created namespace. In one example, the initial block size is selected based on the storage capacity and the usage characteristic.

In one embodiment, controller (2507) determines a mapping efficiency associated with a requested namespace (e.g., an efficiency for mapping host addresses to non-volatile storage media (2509)). In one example, the mapping efficiency is based on the usage of processing resources associated with reading data from non-volatile storage media (2509) and/or writing data to non-volatile storage media (2509). The mapping efficiency can be based on historical data and/or current performance. The mapping efficiency can be based on mapping for the new namespace and/or for prior namespaces having similar characteristics. In one example, the processing resources include computational bandwidth for controller (2507) and/or available memory storage capacity. In one example, the memory storage capacity is available memory in volatile DRAM (2506).

Figure 26:
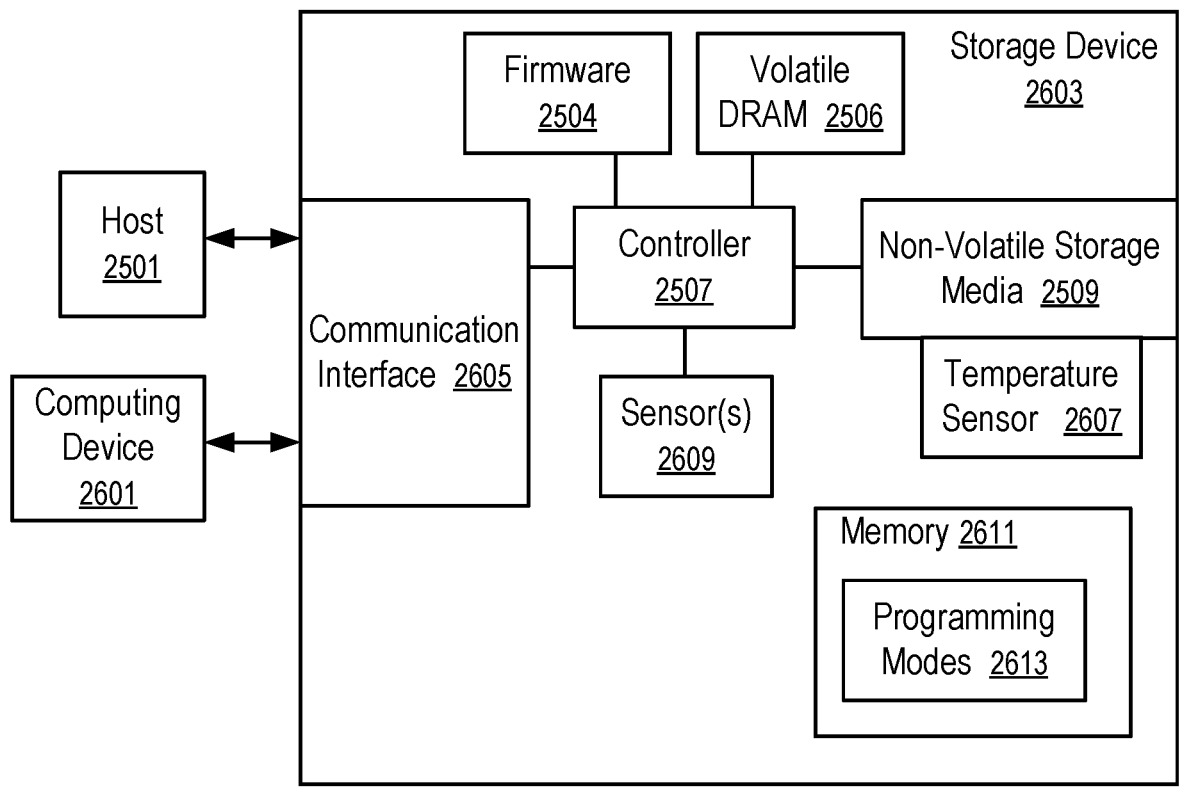
FIG. 26 shows a storage device that uses signaling from one or more sensors when selecting block sizes for namespace management according to one embodiment.

FIG. 26 shows a storage device (2603) that uses signaling from one or more sensors (2609) when selecting block sizes (e.g., 133) for namespace management according to one embodiment. Sensors (2609) can include, for example, image sensors, temperature sensors, motion sensors, location sensors (e.g., GPS sensor), radar sensors, etc. Sensors (2609) can include temperature sensor (2607).

In one embodiment, sensors (2609) provide signaling to controller (2507) indicative of a context for storage device (2603). In one example, the context is an operating condition or state of storage device (2603). For example, the context can include an operating temperature, an operating pressure, an extent of remaining power, and/or a rate of power usage.

In one example, the context is an environment in which storage device (2603) is operating. For example, the context can include objects identified in the surroundings of storage device (2603), such as other vehicles. In one example, storage device (2603) is mounted in an autonomous vehicle, and host (2501) controls one or more components of the autonomous vehicle, including an engine, navigation, and braking.

In one embodiment, temperature sensor (2607) provides signaling to controller (2507) regarding temperatures associated with non-volatile storage media (2509). Programming modes (2613) are stored in memory (2611). Programming modes (2613) are used by controller (2507) to program memory cells in non-volatile storage media (2509). Programming modes (2613) are updated by controller (2507) in response to signaling from temperature sensor (2607).

In one example, in response to signaling from temperature sensor (2607), a programming mode for non-volatile storage media (2509) is changed so that the storage capacity of non-volatile storage media (2509) increases or decreases. In response to the change in the storage capacity, controller (2507) selects a new block size. Then, blocks are allocated to one or more new and/or existing name spaces based on the new block size.

Communication interface (2605) communicates with host (2501). In one example, communication interface (2605) includes host interface (2505). Communication interface (2605) also communicates with computing device (2601). In one example, the communication with computing device (2601) and/or host (2501) is wireless.

In one embodiment, controller (2507) receives a communication from computing device (2601) that instructs controller (2507) to increase or decrease the storage capacity of storage device (2603). In response to receiving the communication, controller (2507) selects a new block size based at least in part on the size of the requested new storage capacity.

In one embodiment, computing device (2601) executes a hypervisor that controls the operation of various virtual machines. In one example, host (2501) is a virtual machine executing on computing device (2601). In one example, each of the virtual machines sends a request to controller (2507) to create a namespace for use by the virtual machine.

In one embodiment, controller (2507) determines one or more characteristics associated with the namespace. Controller (2507) selects the new block size based at least in part on the determined characteristic. In one example, the characteristic is a type of data stored in the namespace. In one example, the characteristic is an extent of use of the data stored in the namespace. In one example, the characteristic is a source and/or destination for data stored in the namespace.

In one embodiment, controller (2507) selects a new block size by selecting a number of blocks based on the new storage capacity. Controller (2507) determines a preliminary block size based on the new storage capacity divided by the selected number of blocks. Then, controller (2507) rounds up the preliminary block size to the closest power of two to provide the new block size.

In one example, the request to create a namespace is sent by host (2501) in response to a request made by a user in a user interface of host (2501). In one example, the request is made by an application executing on host (2501). In one example, the request is made in response to a characteristic of the namespace determined by host (2501) and/or computing device (2601).

In one embodiment, controller (2507) collects data from one or more sensors (2609). Controller (2507) selects a new storage capacity based on the collected data. Then, controller (2507) selects a new block size based on the new storage capacity.

In one embodiment, controller (2507) determines an error rate associated with reading data from non-volatile storage media (2509). Controller (2507) increases the storage capacity by an extent that is based on the error rate.

Figure 27:
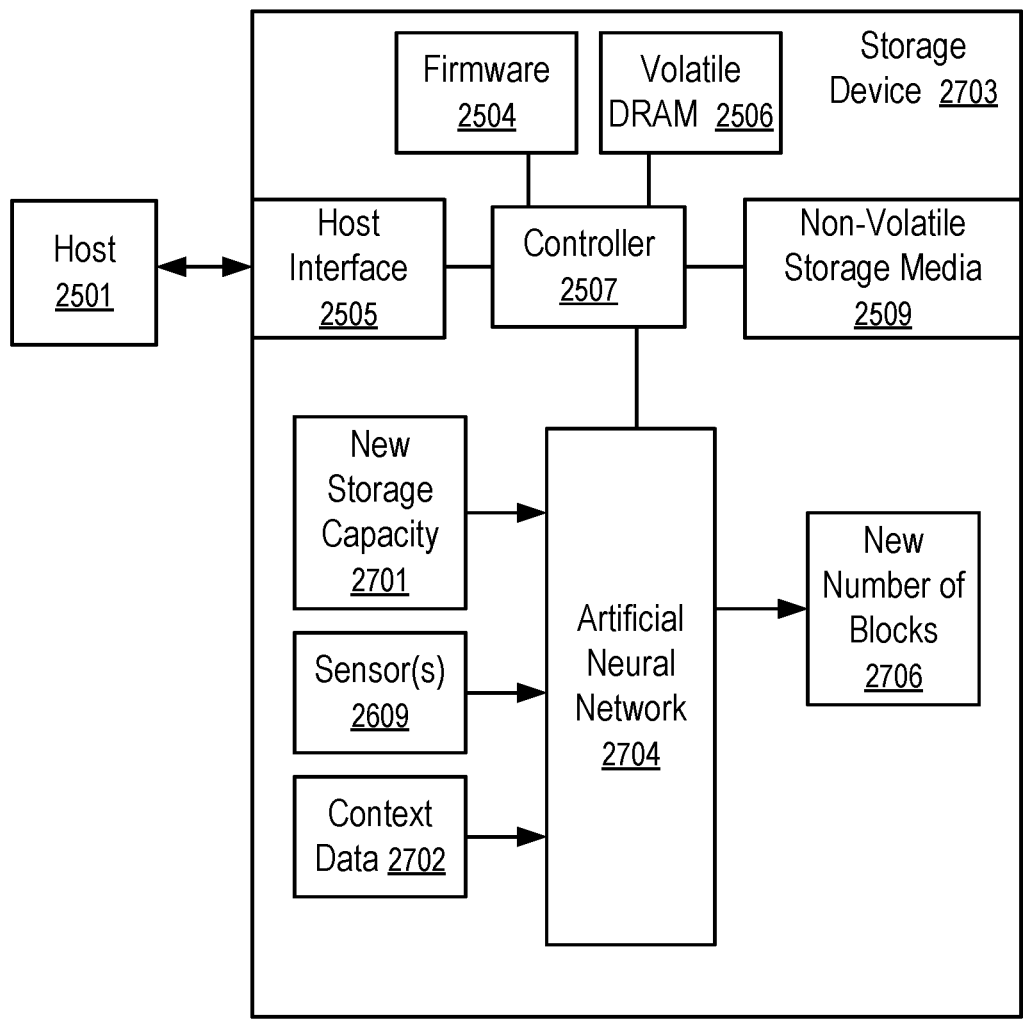
FIG. 27 shows a storage device having a controller used to select block sizes based at least in part on output from a computer model according to one embodiment.

FIG. 27 shows a storage device (2703) having controller (2507), which is used to select block sizes based at least in part on output from a computer model according to one embodiment. In one example, the computer model is artificial neural network (2704). In one example, storage device (2703) is similar to storage device (2503, 2603).

Artificial neural network (2704) can use various inputs. These inputs can include a new storage capacity (2701) that has been selected by controller (2507) or requested by host (2501). The inputs can further include signaling from sensors (2609). The inputs can further include context data (2702). In one example, context data (2702) is provided by host (2501) and or computing device (2601).

In one example, the output from artificial neural network (2704) is a new number of blocks (2706). Controller (2507) uses new number of blocks (2706) for selecting a new block size, as discussed above.

Figure 28:
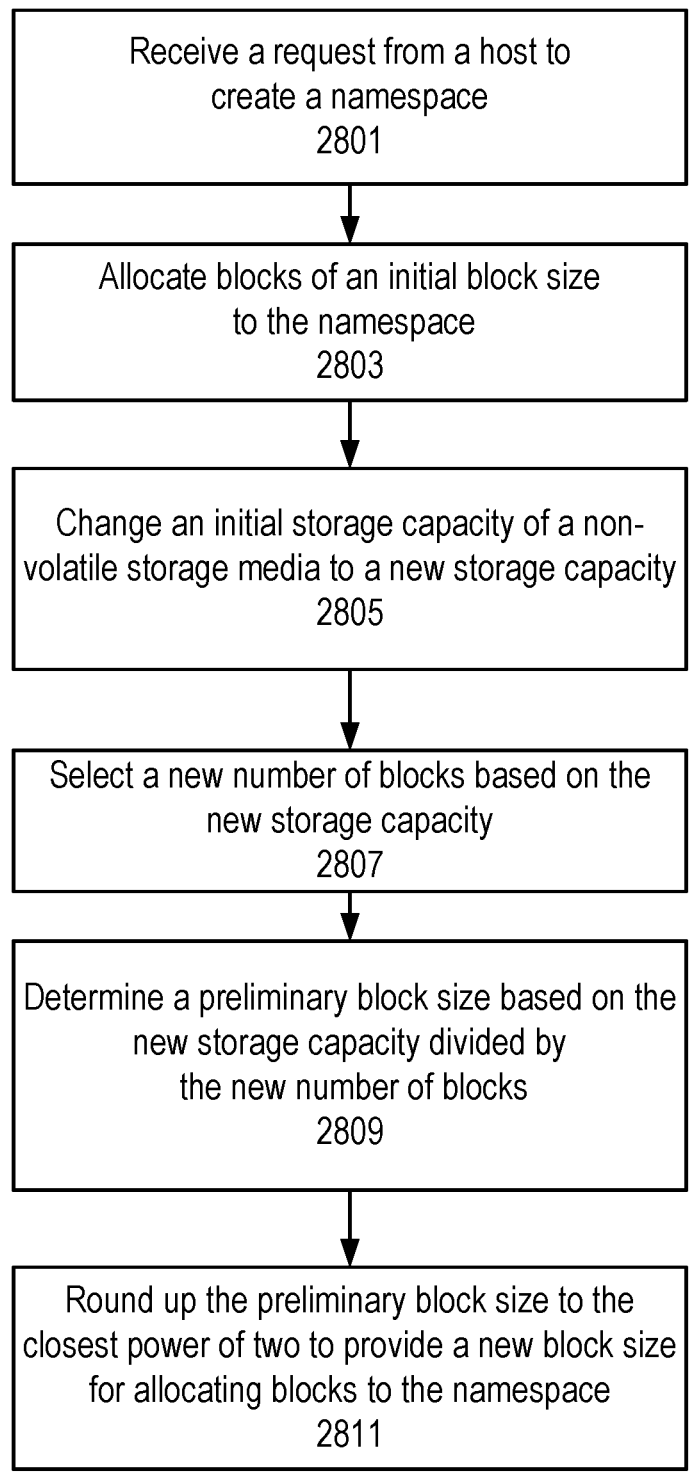
FIG. 28 shows a method to select a new block size for allocating blocks to one or more namespaces according to one embodiment.

FIG. 28 shows a method to select a new block size for allocating blocks to one or more namespaces according to one embodiment. For example, the method of FIG. 28 can be implemented in the systems of FIGS. 25-27.

The method of FIG. 28 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 28 is performed at least in part by one or more processing devices (e.g., controller 2507 of FIG. 25).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 2801, a request is received from a host to create a namespace. In one example, storage device (2503) receives a request from host (2501).

At block 2803, blocks of an initial block size are allocated to the namespace.

At block 2805, an initial storage capacity of a non-volatile storage media is changed to a new storage capacity. In one example, the new storage capacity has a size requested by host (2501), or as determined by controller (2507) based on signaling from sensors (2609).

At block 2807, a new number of blocks is selected based on the new storage capacity. In one example, new number of blocks (2706) is provided as an output from artificial neural network (2704) based on new storage capacity (2701).

At block 2809, a preliminary block size is determined based on the new storage capacity divided by the selected new number of blocks.

At block 2811, the preliminary block size is rounded up to the closest power of two to provide a new block size for allocating blocks to the namespace. In one example, a namespace map (e.g., namespace map (273)) is updated to reflect a new allocation of blocks to the namespace where each block has the same new block size.

In one embodiment, a device (e.g., 2503, 2603, 2703) includes: a host interface; a controller (e.g., 2507); non-volatile storage media having a storage capacity; and firmware containing instructions which, when executed by the controller, instruct the controller to at least: select, based on the storage capacity, a block size (e.g., 133) for allocating blocks to namespaces; receive, via the host interface, a request from a host to create a first namespace; and allocate at least a portion of the blocks to the first namespace. In one example, the block size is a predetermined block size for an L-block.

In one embodiment, the block size is a first block size, and selecting the first block size includes: selecting, based on the storage capacity, a number of blocks; determining a preliminary block size based on the storage capacity divided by the number of blocks; and rounding up the preliminary block size to a closest power of two to provide the first block size.

In one embodiment, a granularity determined based on the storage capacity divided by the first block size is within a defined range (e.g., a predetermined range, or a range based on an output from artificial neural network (2704)).

In one embodiment, the instructions further instruct the controller to determine a resource usage associated with address mapping. The number of blocks is selected further based on the resource usage.

In one embodiment, the request includes a requested size for the first namespace, and the allocated portion of the blocks has a total size greater than the requested size.

In one embodiment, the instructions further instruct the controller to determine at least one usage characteristic associated with the first namespace. The block size is selected further based on the usage characteristic.

In one embodiment, the usage characteristic is a characteristic of an application executing on the host, and data used by the application is stored in the first namespace.

In one embodiment, the instructions further instruct the controller to determine a mapping efficiency for the first namespace. The block size is selected further based on the determined mapping efficiency.

In one embodiment, the mapping efficiency is determined based on a usage of processing resources (e.g., processors, controllers, memory, etc.) associated with at least one of reading data from the non-volatile storage media, or writing data to the non-volatile storage media.

In one embodiment, the device further includes a counter configured to count a quantity of data, where the block size is selected further based on the quantity of data.

In one embodiment, the quantity of data is a quantity of data written to memory cells of the non-volatile storage media.

In one embodiment, the instructions further instruct the controller to determine a usage of the first namespace, the usage determined based on a quantity of data stored in the non-volatile storage media. The block size is selected further based on the usage.

In one embodiment, a device (e.g., 2503, 2603, 2703) includes: a host interface; a controller; non-volatile storage media; and firmware containing instructions which, when executed by the controller, instruct the controller to at least: receive, via the host interface, a request from a host to create a namespace; allocate blocks of a first block size to the namespace; increase a storage capacity of the non-volatile storage media; select, based on the increased storage capacity, a second block size for allocating blocks to the namespace, where the second block size is greater than the first block size; and allocate blocks of the second block size to the namespace.

In one embodiment, the instructions further instruct the controller to determine at least one characteristic associated with the namespace. The second block size is selected further based on the determined characteristic.

In one embodiment, the device further includes a counter configured to count a quantity of at least one of data read from the non-volatile storage media or data written to the non-volatile storage media. The second block size is selected further based on the quantity.

In one embodiment, selecting the second block size includes: selecting, based on the increased storage capacity, a number of blocks (e.g., 2706); determining a preliminary block size based on the increased storage capacity divided by the number of blocks; and rounding up the preliminary block size to a closest power of two to provide the second block size.

In one embodiment, the instructions further instruct the controller to determine a resource usage associated with the non-volatile storage media. The number of blocks is selected further based on the resource usage.

In one embodiment, the second block size is a multiple of the first block size.

In one embodiment, increasing the storage capacity includes changing a programming mode for memory cells of the non-volatile storage media.

In one embodiment, the device further includes at least one sensor and memory, where the instructions further instruct the controller to receive signaling from the sensor. Changing the programming mode includes selecting, based on the signaling, a new programming mode for the memory cells from a plurality of programming modes (e.g., SLC, TLC) stored in the memory.

In one embodiment, changing the programming mode includes changing from a first programming mode in which each memory cell stores a charge representative of a single bit of data (e.g., SLC), to a second programming mode in which each memory cell stores a charge representative of at least two bits of data (e.g., TLC).

In one embodiment, the storage capacity is increased in response to a request from the host.

In one embodiment, the request is sent by the host in response to: a request made in a user interface of the host; a request made by an application executing on the host; and/or a characteristic of the namespace determined by the host.

In one embodiment, the instructions further instruct the controller to receive, over a wireless network (e.g., receive wirelessly by communication interface 2605), a communication requesting an increase in the storage capacity. The storage capacity is increased in response to receiving the communication.

In one embodiment, the communication is received from a computing device (e.g., 2601) other than the host.

In one embodiment, the device further includes at least one sensor (e.g., sensors (2609)), where the instructions further instruct the controller to: collect data from the sensor; and select a new storage capacity based on the collected data. The storage capacity is increased to the new storage capacity.

In one embodiment, the at least one sensor includes a temperature sensor (e.g., 2607) configured to indicate a temperature of the non-volatile storage media.

In one embodiment, the instructions further instruct the controller to determine an error rate associated with reading data from memory cells of the non-volatile storage media. An extent of the increase in the storage capacity is based on the error rate.

In one embodiment, a method includes: receiving a request from a host to create a namespace; allocating blocks of a first block size to the namespace; changing a storage capacity of a non-volatile storage media to a new storage capacity; in response to changing the storage capacity, selecting a second block size for allocating blocks to the namespace, where the second block size is different from the first block size; and allocating blocks of the second block size to the namespace.

In one embodiment, the non-volatile storage media is configured in a memory device (e.g., storage device (2503) configured as a solid-state drive). The method further includes: collecting data associated with operation of the memory device; and generating an output from a computer model having the collected data as input. The second block size is selected based on the output from the computer model.

In one embodiment, the computer model is an artificial neural network (e.g., 2704); the output is a number of blocks; and selecting the second block size includes determining a preliminary block size based on the new storage capacity divided by the number of blocks, and rounding up the preliminary block size to a closest power of two to provide the second block size.

In one embodiment, the collected data includes data regarding address translation, and usage of the storage capacity.

In one embodiment, a non-transitory computer-readable storage medium stores instructions which, when executed by a controller of a computer storage device, cause the controller to: receive a request from a host to create a namespace; allocate blocks of a first block size to the namespace; change a storage capacity of a non-volatile storage media to a new storage capacity; select, based on the new storage capacity, a second block size for allocating blocks to the namespace, wherein the second block size is different from the first block size; and allocate blocks of the second block size to the namespace.

In one embodiment, selecting the second block size includes: selecting, based on the new storage capacity, a number of blocks; determining a preliminary block size based on the new storage capacity divided by the selected number of blocks; and rounding up the preliminary block size to a closest power of two to provide the second block size.

In one embodiment, the instructions further cause the controller to determine a resource usage associated with data stored in the non-volatile storage media. The number of blocks is selected further based on the determined resource usage.

A non-transitory computer storage medium can be used to store instructions of the firmware (104, 2504). When the instructions are executed by the controller (107, 2507) of the computer storage device (103, 2503), the instructions cause the controller (107, 2507) to perform one of the methods discussed above.

In one embodiment, the controller can select the block size at the time of initial manufacture or operation, and/or can dynamically select various block sizes during operation of the storage device. Dynamic selection of the block size can be based on signaling from sensors of the storage device and/or host.

In one embodiment, a varying storage capacity is due to different storage devices being shipped from a manufacturer. In one example, a 10 GB SSD is shipped with the same firmware that is installed in a 100 GB SSD. The 10 GB SSD and 100 GB SSD each have a different storage capacity. A change from shipping the 10 GB SSD to shipping the 100 GB SSD causes the increase in the storage capacity handled by the firmware.

In one embodiment, the storage capacity of an SSD may change by changing the programming mode of memory cells. If the programming mode of a memory cell changes from SLC (single-level cell) to MLC (multi-level cell) or TLC (triple-level cell), the storage capacity is doubled or tripled.

In one embodiment, a 100 GB SSD is sold and configured so that a user can use only 10 GB of the storage capacity. After the user satisfies a condition (e.g., purchases additional rights to access), the SSD is updated over-the-air to become an actual operational 100 GB SSD. Thus, the user can have the storage capacity upgrade without the need to swap in the SSD for a new physical device.

In one embodiment, mapping efficiency is considered in selecting a block size. For example, an SSD has 16 GB storage capacity. If the L-block size is 1 GB, the SSD has 16 blocks. The 16 blocks are allocated to certain namespaces. Thus, for example, a look-up table of 16 entries will be needed to map each block to a namespace.

If the SSD storage capacity is divided into an increased number of blocks, the cost of doing the mapping will increase. If the SSD storage capacity is divided into too few blocks, the flexibility of assigned and reassigned spaces to namespaces is reduced. For example, if the L-block size is 8 GB, the 16-GB SSD can accommodate only two namespaces.

If the L-block size is too large and the namespaces created on the SSD are small compared to the L-block size, then it can be inefficient to overprovision extra spaces to the namespaces, or inefficient to handle partial blocks.

When the block size is a power of two, the computation to map addresses can be most efficient. A desirable range of total blocks can be predetermined, or as a function of namespaces expected to be created on the SSD, or determined over a period of time of usage. Over time, the mapping efficiency can be measured and optimized for various namespace usages. Thus, a predictive model may be established to best optimize the combined goal of efficiency in address translation, and storage space usage.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device comprising:
a host interface;
a controller;
non-volatile storage media having a storage capacity; and
firmware containing instructions which, when executed by the controller, instruct the controller to at least:
select, based on the storage capacity and based on sensor data indicative of a context of the non-volatile storage media, a block size for allocating blocks to namespaces;
receive, via the host interface, a request from a host to create a first namespace; and
allocate at least a portion of the blocks to the first namespace.

2. The device of claim 1, wherein the block size is a first block size, and selecting the first block size comprises:
selecting, based on the storage capacity, a number of blocks;
determining a preliminary block size based on the storage capacity divided by the number of blocks; and
rounding up the preliminary block size to a closest power of two to provide the first block size.

3. The device of claim 2, wherein a granularity determined based on the storage capacity divided by the first block size is within a defined range.

4. The device of claim 2, wherein the instructions further instruct the controller to:
determine a resource usage associated with address mapping;
wherein the number of blocks is selected further based on the resource usage.

5. The device of claim 1, wherein the request includes a requested size for the first namespace, and the allocated portion of the blocks has a total size greater than the requested size.

6. The device of claim 1, wherein the instructions further instruct the controller to:
determine at least one usage characteristic associated with the first namespace;
wherein the block size is selected further based on the usage characteristic.

7. The device of claim 6, wherein the usage characteristic is a characteristic of an application executing on the host, and data used by the application is stored in the first namespace.

8. The device of claim 1, wherein the instructions further instruct the controller to:
determine a mapping efficiency for the first namespace;
wherein the block size is selected further based on the determined mapping efficiency.

9. The device of claim 8, wherein the mapping efficiency is determined based on a usage of processing resources associated with at least one of reading data from the non-volatile storage media, or writing data to the non-volatile storage media.

10. The device of claim 1, further comprising a counter configured to count a quantity of data, wherein the block size is selected further based on the quantity of data.

11. The device of claim 10, wherein the quantity of data is a quantity of data written to memory cells of the non-volatile storage media.

12. The device of claim 1, wherein the instructions further instruct the controller to:
determine a usage of the first namespace, the usage determined based on a quantity of data stored in the non-volatile storage media;
wherein the block size is selected further based on the usage.

13. A device comprising:
a host interface;
a controller;
non-volatile storage media; and
firmware containing instructions which, when executed by the controller, instruct the controller to at least:
receive, via the host interface, a request from a host to create a namespace;
allocate blocks of a first block size to the namespace;
increase, based on sensor data indicative of a context of the non-volatile storage media, a storage capacity of the non-volatile storage media;
select, based on the increased storage capacity, a second block size for allocating blocks to the namespace, wherein the second block size is greater than the first block size; and
allocate blocks of the second block size to the namespace.

14. The device of claim 13, wherein the instructions further instruct the controller to:
determine at least one characteristic associated with the namespace;
wherein the second block size is selected further based on the determined characteristic.

15. The device of claim 13, further comprising a counter configured to count a quantity of at least one of data read from the non-volatile storage media or data written to the non-volatile storage media, wherein the second block size is selected further based on the quantity.

16. The device of claim 13, wherein selecting the second block size comprises:
selecting, based on the increased storage capacity, a number of blocks;
determining a preliminary block size based on the increased storage capacity divided by the number of blocks; and
rounding up the preliminary block size to a closest power of two to provide the second block size.

17. The device of claim 16, wherein the instructions further instruct the controller to:
determine a resource usage associated with the non-volatile storage media;
wherein the number of blocks is selected further based on the resource usage.

18. The device of claim 13, wherein the second block size is a multiple of the first block size.

19. The device of claim 13, wherein increasing the storage capacity comprises changing a programming mode for memory cells of the non-volatile storage media.

20. The device of claim 19, further comprising at least one sensor and memory, wherein the instructions further instruct the controller to:
receive signaling from the sensor,
wherein changing the programming mode comprises selecting, based on the signaling, a new programming mode for the memory cells from a plurality of programming modes stored in the memory.

21. The device of claim 19, wherein changing the programming mode comprises changing from a first programming mode in which each memory cell stores a charge representative of a single bit of data, to a second programming mode in which each memory cell stores a charge representative of at least two bits of data.

22. The device of claim 13, wherein the storage capacity is increased in response to a request from the host.

23. The device of claim 22, wherein the request is sent by the host in response to:
a request made in a user interface of the host;
a request made by an application executing on the host; or
a characteristic of the namespace determined by the host.

24. The device of claim 13, wherein the instructions further instruct the controller to:
receive, over a wireless network, a communication requesting an increase in the storage capacity;
wherein the storage capacity is increased in response to receiving the communication.

25. The device of claim 24, wherein the communication is received from a computing device other than the host.

26. The device of claim 13, further comprising at least one sensor, wherein the instructions further instruct the controller to:
collect the sensor data from the sensor, and
select a new storage capacity based on the collected sensor data;
wherein the storage capacity is increased to the new storage capacity.

27. The device of claim 26, wherein the at least one sensor comprises a temperature sensor configured to indicate a temperature of the non-volatile storage media.

28. The device of claim 13, wherein the instructions further instruct the controller to:
determine an error rate associated with reading data from memory cells of the non-volatile storage media;
wherein an extent of the increase in the storage capacity is based on the error rate.

29. A method comprising:
receiving a request from a host to create a namespace;
allocating blocks of a first block size to the namespace;
changing, based on sensor data indicative of a context of a non-volatile storage media, a storage capacity of the non-volatile storage media to a new storage capacity;
in response to changing the storage capacity, selecting a second block size for allocating blocks to the namespace, wherein the second block size is different from the first block size; and
allocating blocks of the second block size to the namespace.

30. The method of claim 29, wherein the non-volatile storage media is configured in a memory device, the method further comprising:
collecting data associated with operation of the memory device; and
generating an output from a computer model having the collected data as input;
wherein the second block size is selected based on the output from the computer model.

31. The method of claim 30, wherein:
the computer model is an artificial neural network;
the output is a number of blocks; and
selecting the second block size comprises determining a preliminary block size based on the new storage capacity divided by the number of blocks, and rounding up the preliminary block size to a closest power of two to provide the second block size.

32. The method of claim 30, wherein the collected data comprises data regarding address translation, and usage of the storage capacity.

33. A non-transitory computer-readable storage medium storing instructions which, when executed by a controller of a computer storage device, cause the controller to:
- receive a request from a host to create a namespace;
- allocate blocks of a first block size to the namespace;
- change, based on sensor data indicative of a context of a non-volatile storage media, a storage capacity of the non-volatile storage media to a new storage capacity;
- select, based on the new storage capacity, a second block size for allocating blocks to the namespace, wherein the second block size is different from the first block size; and
- allocate blocks of the second block size to the namespace.

34. The non-transitory computer-readable storage medium of claim 33, wherein selecting the second block size comprises:
- selecting, based on the new storage capacity, a number of blocks;
- determining a preliminary block size based on the new storage capacity divided by the selected number of blocks; and
- rounding up the preliminary block size to a closest power of two to provide the second block size.

35. The non-transitory computer-readable storage medium of claim 34, wherein the instructions further cause the controller to:
- determine a resource usage associated with data stored in the non-volatile storage media;
- wherein the number of blocks is selected further based on the determined resource usage.

* * * * *